United States Patent
Wright

(10) Patent No.: US 8,151,759 B2
(45) Date of Patent: *Apr. 10, 2012

(54) ORBITAL ENGINE

(75) Inventor: Michael D. Wright, Casey, IL (US)

(73) Assignee: Wright Innovations, LLC, Effingham, IL (US)

( * ) Notice: Subject to any disclaimer, the term of this patent is extended or adjusted under 35 U.S.C. 154(b) by 493 days.

This patent is subject to a terminal disclaimer.

(21) Appl. No.: 11/844,328

(22) Filed: Aug. 23, 2007

(65) Prior Publication Data

US 2008/0050258 A1 Feb. 28, 2008

Related U.S. Application Data

(60) Provisional application No. 60/839,798, filed on Aug. 24, 2006.

(51) Int. Cl.
*F02B 53/00* (2006.01)
*F01C 1/08* (2006.01)
*F01C 1/00* (2006.01)
*F01C 1/30* (2006.01)

(52) U.S. Cl. ........ 123/233; 123/228; 123/229; 123/206; 418/195; 418/38; 418/5; 418/227

(58) Field of Classification Search ............... 123/233, 123/228–229, 206, 18 R; 418/195–196, 418/227, 36–38, 91; 310/17; 227/413, 1, 227/3, 56

See application file for complete search history.

(56) References Cited

U.S. PATENT DOCUMENTS

| | | | |
|---|---|---|---|
| 259,966 A | 6/1882 | Wing | 418/195 |
| 889,439 A | 6/1908 | Carter | 418/195 |
| 906,684 A | 12/1908 | Bower | 418/117 |
| 979,638 A | 12/1910 | Ball | 418/195 |
| 1,079,743 A | 11/1913 | Callaway | 418/5 |
| 1,106,666 A | 8/1914 | Miller | 723/233 |
| 1,266,605 A | 5/1918 | Madero | 418/195 |
| 1,332,468 A | 3/1920 | Henig et al. | 123/238 |
| 1,346,805 A * | 7/1920 | Barber | 123/18 R |
| 1,348,675 A | 8/1920 | Weed | 123/245 |
| 1,704,254 A | 3/1929 | Jaffe | 123/229 |
| 1,720,098 A | 7/1929 | Shreffler et al. | 123/229 |
| 1,729,242 A | 9/1929 | Bregere | 418/33 |
| 1,997,119 A | 4/1935 | Rice et al. | 123/233 |
| 2,158,933 A | 5/1939 | Good | 418/36 |
| 2,273,625 A | 2/1942 | Concannon | 123/238 |
| 2,289,342 A | 7/1942 | Canfield | 123/240 |

(Continued)

FOREIGN PATENT DOCUMENTS

AU 467415 1/1973

(Continued)

OTHER PUBLICATIONS

PCT International Search Report and Written Opinion of the International Searching Authority, International Application No. PCT/US07/18831, 8 pages.

(Continued)

*Primary Examiner* — Thai Ba Trieu

(74) *Attorney, Agent, or Firm* — Faegre Baker Daniels

(57) ABSTRACT

The present disclosure includes an engine having a torodial piston chamber, at least one piston positioned in the torodial piston chamber, and at least one engine valve positioned to interact with the torodial piston chamber.

3 Claims, 34 Drawing Sheets

U.S. PATENT DOCUMENTS

| | | | | |
|---|---|---|---|---|
| 2,373,791 | A * | 4/1945 | Stewart | 418/35 |
| 2,779,318 | A | 1/1957 | Strader | 123/245 |
| 2,897,798 | A | 8/1959 | Benton | 418/195 |
| 2,988,008 | A | 6/1961 | Wankel | |
| 3,087,671 | A | 4/1963 | Myles | 418/34 |
| 3,244,156 | A | 4/1966 | Curtiss | 418/36 |
| 3,333,763 | A | 8/1967 | Jungbluth et al. | 418/91 |
| 3,354,871 | A | 11/1967 | Skrob | 123/229 |
| 3,381,669 | A | 5/1968 | Traugott | 418/38 |
| 3,505,981 | A | 4/1970 | Turnbull | 418/38 |
| 3,516,392 | A * | 6/1970 | Morgan | 123/18 A |
| RE27,191 | E | 10/1971 | Skrob | 123/229 |
| 3,645,239 | A | 2/1972 | Cena | 123/245 |
| 3,739,754 | A | 6/1973 | Nutku | 123/245 |
| 3,867,912 | A | 2/1975 | Parr et al. | 123/238 |
| 3,888,146 | A | 6/1975 | Tomenceak | 408/59 |
| 3,897,756 | A | 8/1975 | Upchurch | 123/238 |
| 3,937,187 | A * | 2/1976 | Bergen | 418/36 |
| 4,013,046 | A | 3/1977 | Kemp | 418/195 |
| 4,035,111 | A | 7/1977 | Cronen, Sr. | 418/38 |
| 4,077,365 | A | 3/1978 | Schlueter | |
| 4,078,529 | A | 3/1978 | Warwick | |
| 4,242,591 | A | 12/1980 | Harville | 290/112 |
| 4,319,551 | A | 3/1982 | Rubinshtein | 123/245 |
| 4,420,161 | A * | 12/1983 | Miller | 277/418 |
| 4,421,073 | A | 12/1983 | Arregui et al. | |
| 4,543,038 | A * | 9/1985 | Kitaguchi | 277/432 |
| 4,683,852 | A | 8/1987 | Kypreos-Pantazis | 123/230 |
| 4,753,073 | A | 6/1988 | Chandler | |
| 4,836,149 | A | 6/1989 | Newbold | |
| 5,046,465 | A | 9/1991 | Yi | 123/248 |
| 5,192,201 | A | 3/1993 | Beben | 418/38 |
| 5,199,391 | A | 4/1993 | Kovalenko | 418/36 |
| 5,203,297 | A | 4/1993 | Iversen | 123/248 |
| 5,222,463 | A | 6/1993 | Farrell | |
| 5,303,546 | A | 4/1994 | Farrell | |
| 5,323,737 | A | 6/1994 | Farrell | |
| 5,342,176 | A | 8/1994 | Redlich | |
| 5,467,744 | A | 11/1995 | Farrell | |
| 5,645,027 | A | 7/1997 | Esmailzadeh | |
| 5,996,538 | A * | 12/1999 | Rocha et al. | 123/18 A |
| 6,049,146 | A | 4/2000 | Takara | 310/24 |
| 6,119,649 | A | 9/2000 | Raab | 123/233 |
| 6,270,322 | B1 * | 8/2001 | Hoyt | 123/18 A |
| 6,526,925 | B1 | 3/2003 | Green | |
| 6,543,225 | B2 | 4/2003 | Scuderi | |
| 6,546,908 | B1 | 4/2003 | Pekau | 123/206 |
| 6,672,274 | B2 | 1/2004 | Winterpacht | 123/232 |
| 6,722,127 | B2 | 4/2004 | Scuderi et al. | |
| 6,910,397 | B2 | 6/2005 | Shapiro et al. | |
| 7,059,294 | B2 | 6/2006 | Wright | |
| 7,182,061 | B2 | 2/2007 | Georgescu | 123/245 |
| 7,305,937 | B2 | 12/2007 | Sabin | 123/18 A |
| 7,305,963 | B2 * | 12/2007 | Zak | 123/228 |
| 7,344,357 | B2 * | 3/2008 | Couture et al. | 277/413 |
| 7,474,020 | B2 * | 1/2009 | Pal | 310/17 |
| 2003/0102630 | A1 * | 6/2003 | Dinc et al. | 277/355 |
| 2004/0244762 | A1 | 12/2004 | Shapiro et al. | |
| 2004/0255882 | A1 | 12/2004 | Branyon et al. | |
| 2005/0016475 | A1 | 1/2005 | Scuderi et al. | |
| 2005/0016493 | A1 | 1/2005 | Hoose | 123/245 |
| 2005/0263129 | A1 | 12/2005 | Wright | |
| 2005/0271499 | A1 * | 12/2005 | Loy et al. | 415/1 |
| 2007/0257445 | A1 * | 11/2007 | Mortzheim et al. | 277/413 |
| 2008/0251043 | A1 * | 10/2008 | Li | 123/184.21 |
| 2010/0239415 | A1 * | 9/2010 | Turnquist et al. | 415/174.2 |

FOREIGN PATENT DOCUMENTS

| | | |
|---|---|---|
| DE | 2304333 | 8/1974 |
| DE | 3306256 | 8/1984 |
| DE | 3825354 | 2/1990 |
| DE | 3825365 | 2/1990 |
| DE | 4112058 | 11/1993 |
| DE | 4319896 | 12/1994 |
| DE | 19509913 | 9/1996 |
| GB | 2060779 | 5/1981 |
| GB | 2374903 | 10/2002 |
| JP | 04101021 | 4/1992 |
| RU | 2050493 C1 * | 12/1995 |
| WO | WO 03/014527 A1 | 2/2003 |
| WO | WO 03/014598 A1 | 2/2003 |
| WO | WO 2004/076819 A2 | 9/2004 |

OTHER PUBLICATIONS

Unknown Author, "History," http://www.axialvectorengine.com/History.htm, three pages.

Unknown Author, "Axial Vector™ Engine," http://www.axialvectorengine.com/AxialVector.htm, four pages.

Weissler, Paul, "The Little Engine That May," Popular Mechanics, May 1, 2000, three pages.

Stokes, Myron D., "Quantum Parallel: The Saint-Hilaire 'Quasiturbine' As The Basis For a Simultaneous Paradigm Shift In Vehicle Propulsion Systems," Dec. 15, 2003, fourteen pages.

Unknown Author, "Quasiturbine in the Medias," http://www.quasiturbine.com/ERelationInTheMedias.htm, eleven pages.

Unknown Author, "Quasiturbine—A New Approach," http://quasiturbine.promci.qc.ca/, six pages.

Jayasuriya, L., "The Internal Combustion Engine with Oscillating Flaps," http://www.oengine.com/, four pages.

Jayasuriya, L., "The New Internal Combustion Engine," http://www.oengine.com/prototype.htm, seven pages.

Unknown Author, "Prospects of Oscillator Engine," http://www.oengine.com/merits.htm, three pages.

VGT Technologies, Inc., "Roundengine," www.roundengine.com/roundengine_details/patenten_technology.htm, 1 pg.

VGT Technologies, Inc., "Roundengine: How it Works," www.roundengine.com/howitworks/howitworks.htm, 10 pgs.

Karim, G.A. and Shrestha, O.M. Bade, "The V.G.T.' Engine, The Performance of a Variable Geometry Toroidal Engine," VGT Technologies, Inc., 46 pgs.; and Appendix: Karim, G.A. and Shrestha, O.M. Bade, "A Description of the Predictive Model Modified for Application to the VGT Engine", S.A.E. Paper No. 1999-01-3482, 18 pgs.

PCT International Preliminary Report on Patentability, International Application No. PCT/US07/18831, 7 pages, date of completion of the search on Feb. 13, 2008.

Extended European Search Report, European Patent Application No. 07837384.2, 11 pages, date of completion of the search on Feb. 23, 2011.

Entry into the European phase, European Patent Application No. 07837384.2, 13 pages, Dated on Feb. 13, 2009.

* cited by examiner

ORBITAL ENGINE

CROSS REFERENCE TO RELATED APPLICATIONS

This application claims the benefit of U.S. Provisional Patent Application Ser. No. 60/839,798, filed Aug. 24, 2007, titled "ORBITAL ENGINE", the disclosure of which is expressly incorporated by reference herein.

This application is related to U.S. patent application Ser. No. 11/451,120, filed Jun. 12, 2006 and U.S. Pat. No. 7,059,294, the disclosures of which are expressly incorporated herein by reference.

BACKGROUND AND SUMMARY

This invention generally relates to internal combustion engines. More specifically the present invention relates to internal combustion engines having an orbital piston movement in which the pistons move in a toroidal path.

In an exemplary embodiment of the present disclosure, an engine is provided. The engine comprising: an engine block including a toroidal piston chamber, at least a first piston disposed for orbital rotation within the piston chamber, the first piston having a piston ring, and at least a first engine valve and a second engine valve. Each engine valve being rotatable to a first open position permitting the first piston to pass thereby and a second closed position wherein the first piston may not pass thereby. The first engine valve being positionable in a first opening of the toroidal piston chamber and the second engine valve being positionable in a second opening of the toroidal piston chamber. The engine further comprising at least one intake conduit for allowing a fuel mixture to be positioned within the piston chamber. The intake conduit being located between the first engine valve and the second engine valve. The engine further comprising at least one ignition member capable to ignite the fuel mixture resulting in the combustion of the fuel mixture and the creation of combustion gases and at least one exhaust conduit for allowing the combustion gases to exit the piston chamber. As a first piston passes by the first engine valve, the first engine valve moves to the second position forming an ignition chamber area within the piston chamber behind the first piston and between the first piston and the first engine valve. The piston ring of the first piston extending across the first opening of the toroidal piston chamber as the first piston passes by the first engine valve.

In another exemplary embodiment of the present disclosure, a method of operating an engine is provided. The method comprising the steps of providing an orbital engine having a plurality of pistons which orbit through a toroidal piston chamber and a plurality of engine valves which move between an open position and a closed position forming ignition chamber areas in the toroidal piston chamber and exhaust chamber areas in the toroidal piston chamber; controlling a plurality of injectors which provide fuel and air to the ignition chamber areas of the toroidal piston chamber; controlling a plurality of ignition members to ignite a fuel mixture in the toroidal piston chamber; and selecting between at least two operating modes.

In a further exemplary embodiment of the present disclosure, a method of forming a toroidal piston chamber for an engine is provided. The method comprising the steps of: making the toroidal piston chamber having a first cross-sectional area smaller than a desired final cross sectional area of the toroidal piston chamber; and rotating a cutting tool through the toroidal piston chamber to achieve a second cross-sectional area generally equal to the desired final cross sectional area.

In yet another exemplary embodiment of the present disclosure, an engine is provided. The engine comprising: an engine block including a toroidal piston chamber; at least a first piston disposed for orbital rotation within the piston chamber; an output shaft coupled to the first piston through a connecting member; and at least a first seal positioned between the toroidal piston chamber and the output shaft and contacting the connecting member. The first seal including a biasing member. The engine further comprising at least a first engine valve and a second engine valve. Each engine valve being rotatable to a first open position permitting the first piston to pass thereby and a second closed position wherein the first piston may not pass thereby. The engine further comprising at least one intake conduit for allowing a fuel mixture to be positioned within the piston chamber. The intake conduit being located between the first engine valve and the second engine valve. The engine further comprising at least one ignition member capable to ignite the fuel mixture resulting in the combustion of the fuel mixture and the creation of combustion gases; and at least one exhaust conduit for allowing the combustion gases to exit the piston chamber. As a first piston passes by the first engine valve, the first engine valve moves to the second closed position forming an ignition chamber area within the piston chamber behind the first piston and between the first piston and the first engine valve.

In still another exemplary embodiment of the present disclosure, a method of operating an engine is provided. The method comprising the steps of providing an orbital engine having a first piston which orbit through a toroidal piston chamber and a first rotatable engine valve which moves between an open position wherein an opening of the first rotatable engine valve aligns with the toroidal piston chamber and a closed position wherein a tab of the first rotatable engine valve aligns with the toroidal piston chamber; aligning the opening of the first rotatable engine valve with the toroidal piston chamber; passing the first piston through the opening; and aligning the opening of the first rotatable engine valve with an air inlet to provide pressurized air to an area of toroidal piston chamber behind the first piston.

Features and advantages of the present invention will become apparent to those of ordinary skill in the relevant art when the following detailed description of the illustrated embodiments is read in conjunction with the appended drawings in which like reference numerals represent like components throughout the several views.

BRIEF DESCRIPTION OF THE DRAWINGS

The detailed description of the drawings particularly refers to the accompanying figures in which.

The drawings are proportional unless otherwise indicated.

DETAILED DESCRIPTION OF THE DRAWINGS

Figure 5A:
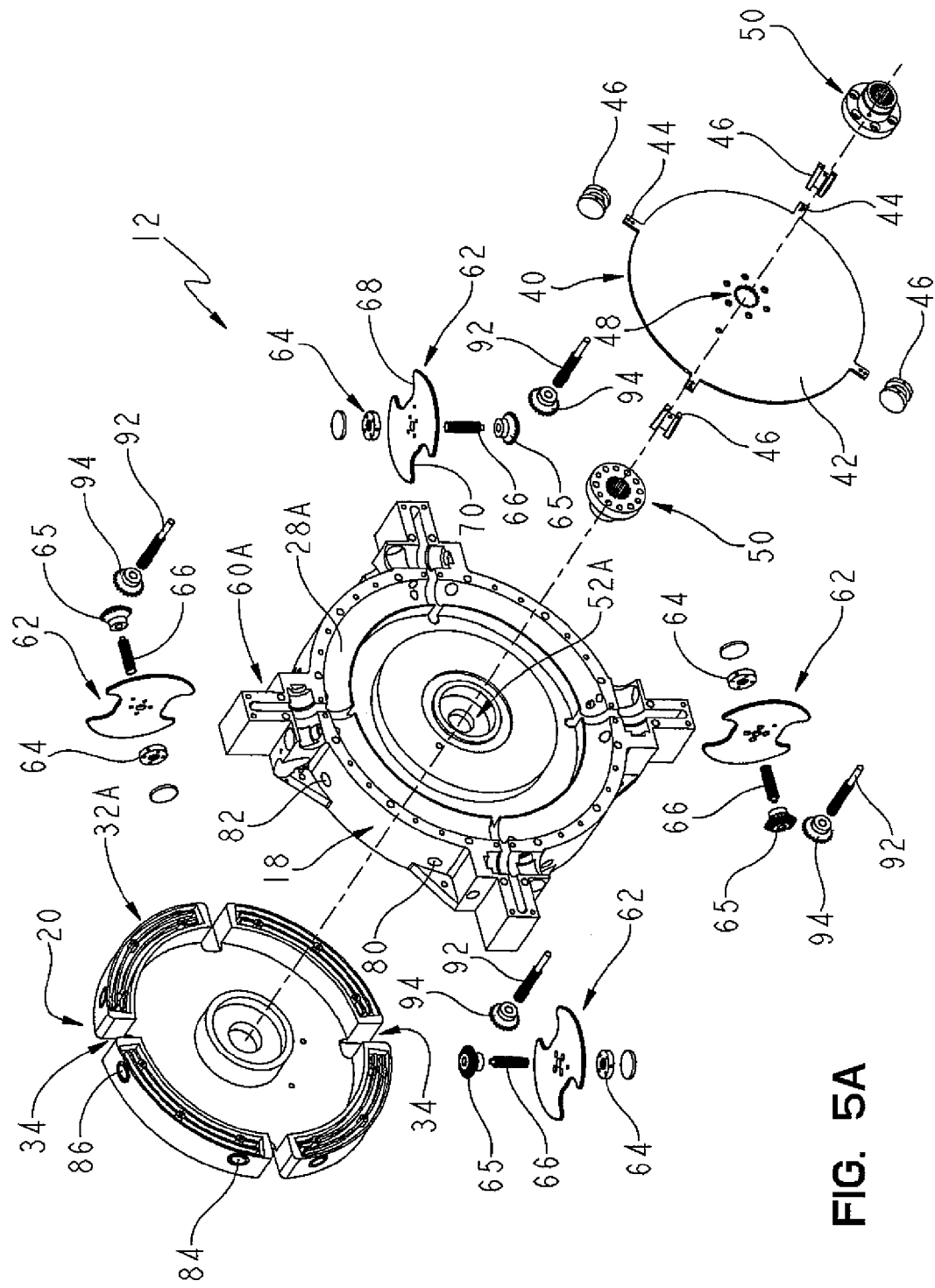
FIGS. 5A and 5B are an exploded, perspective view of the engine of FIG. 1.
Figure 5B:
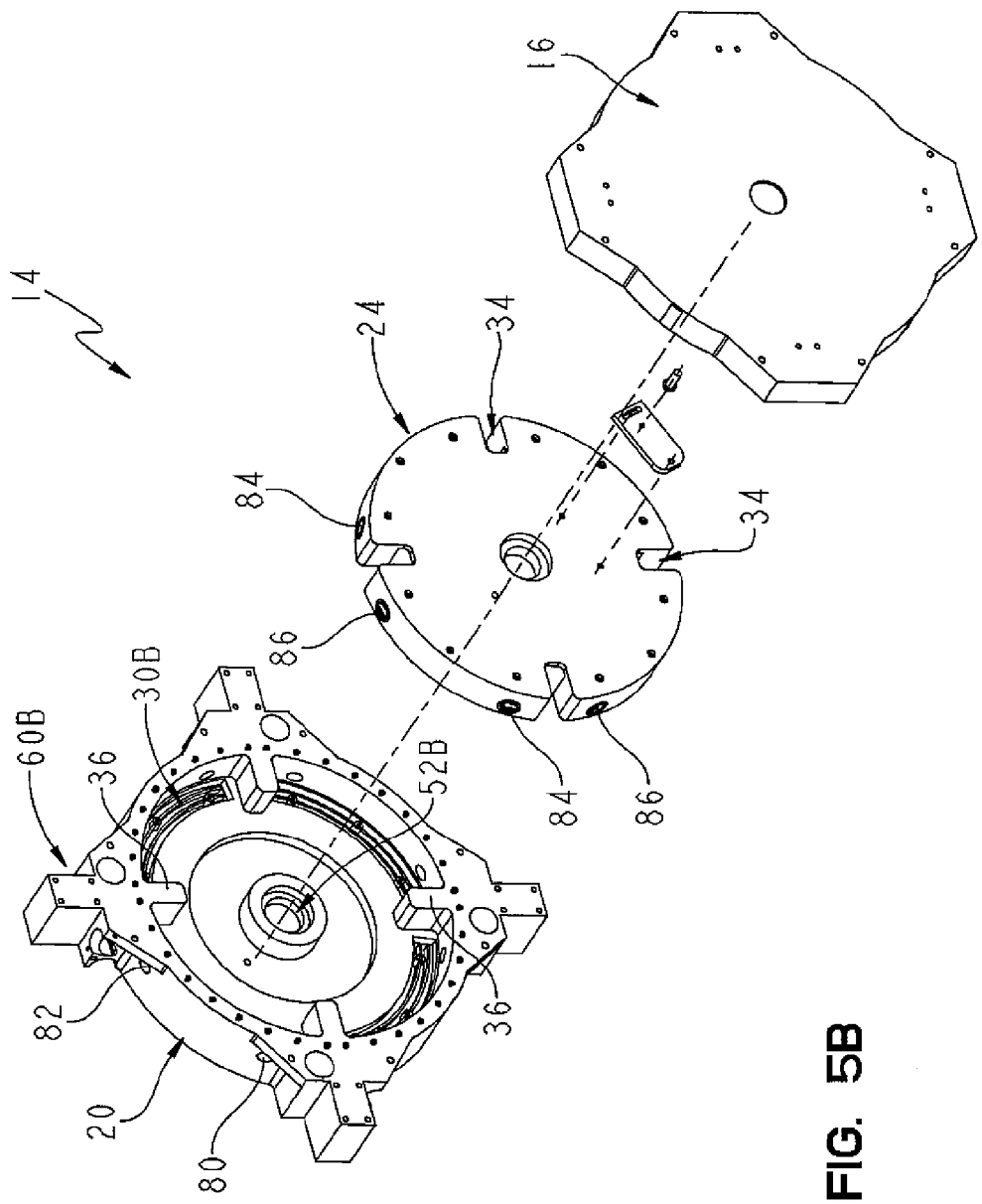
Figure 6:
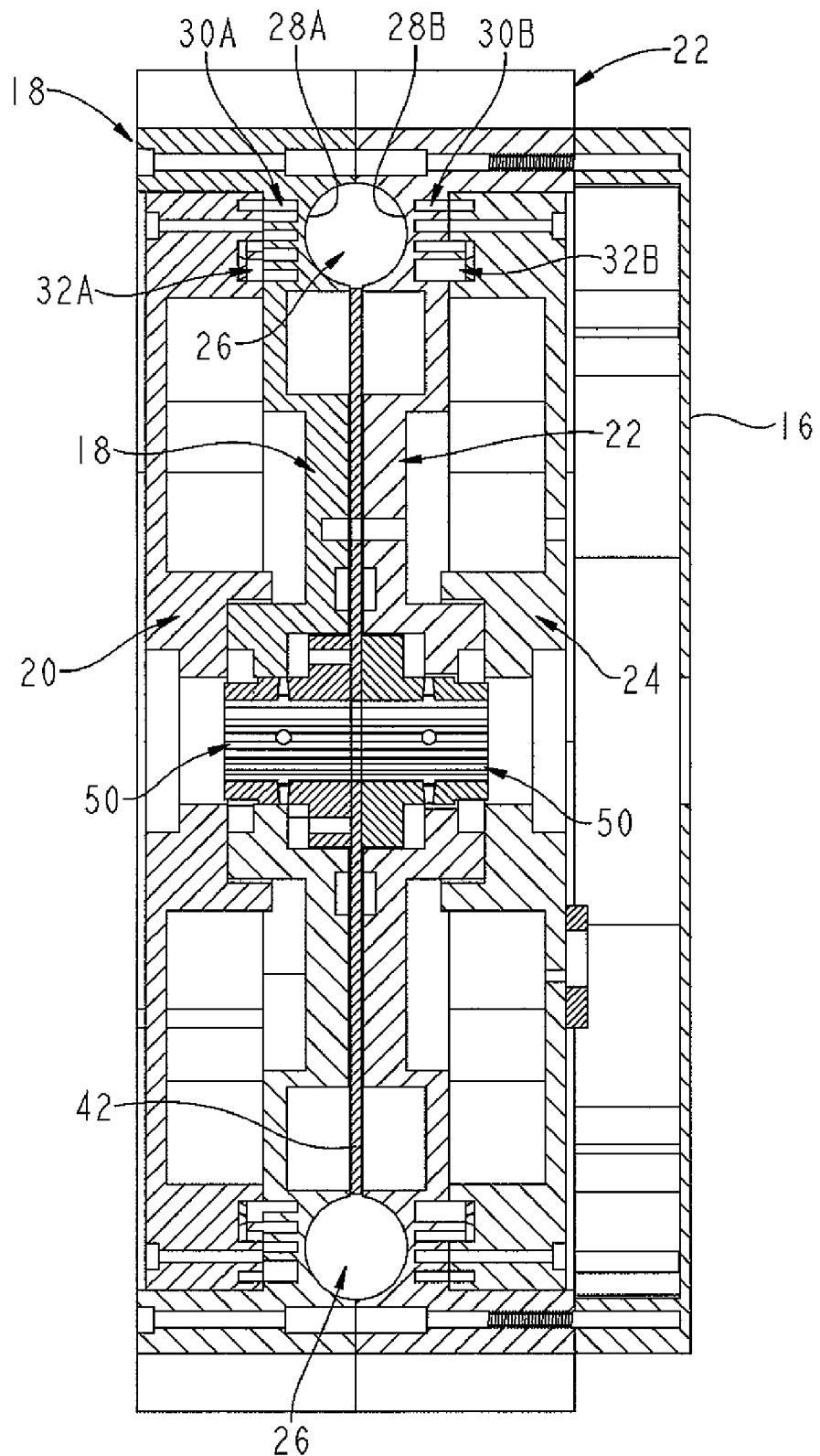
FIG. 6 is a section view of the engine of FIG. 1 illustrating cooling channels of the engine.
Figure 7:
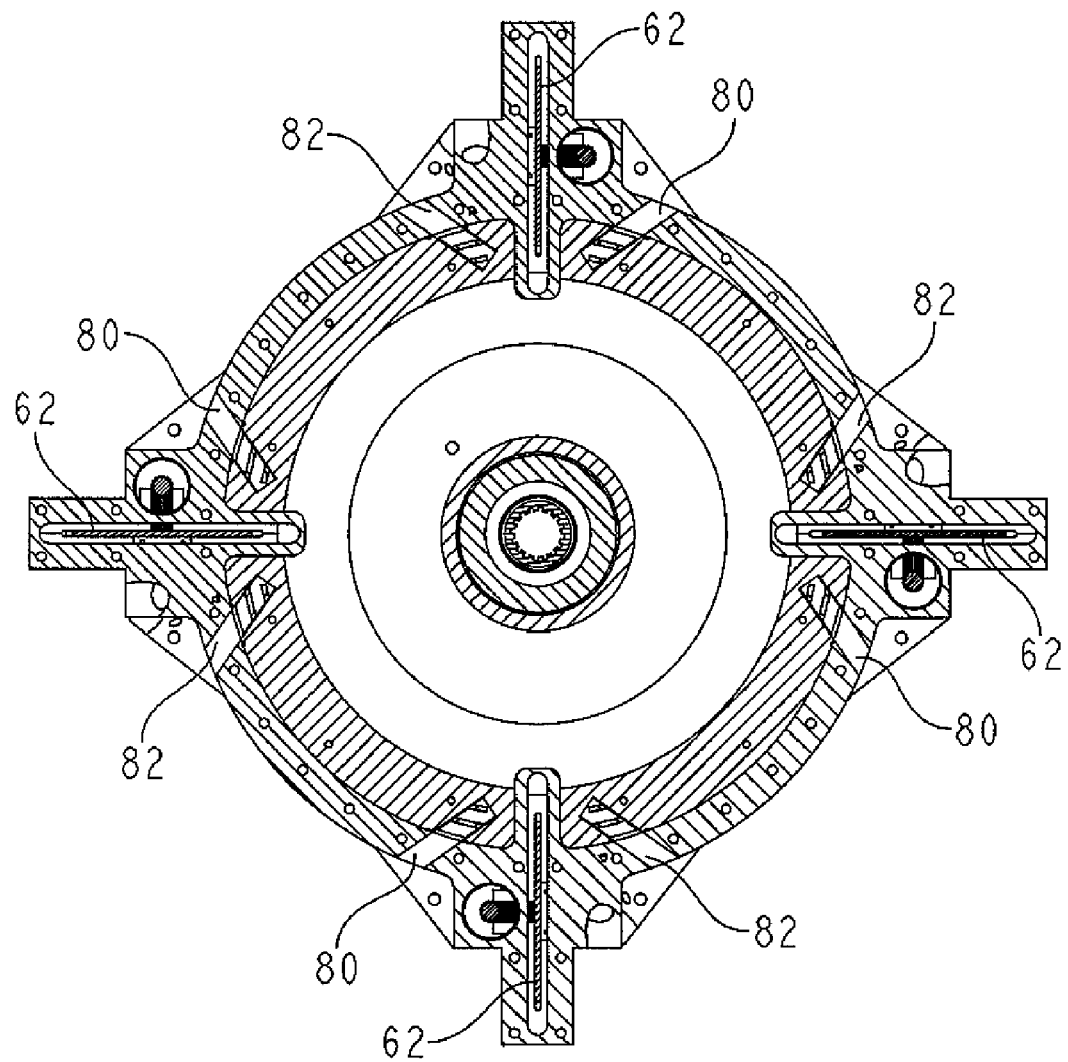
FIG. 7 is a sectional view illustrating the cooling passages of the engine of FIG. 1.

Referring now to the drawings, FIGS. 1-12 show an illustrated embodiment of an orbital engine 10 of the present invention. The engine 10 includes first and second engine block assemblies 12 and 14 and a cover plate 16. Illustratively, the blocks 12 and 14 and cover plate 16 are made from aluminum. Each block half 12 and 14 is illustratively a two-piece design. As best shown in FIGS. 5 and 6, block half 12 includes a first block 18 and a block insert 20. Second block half 14 includes a second block 22 and a block insert 24. Although the engine 10 illustratively includes an engine block formed in two halves 12, 14, more or fewer sections (halves, thirds, quarters, etc.) may be used depending on the methods of manufacturing or the manufacturer's desires. For example, for a smaller engine, two halves should be suitable, while for a larger engine, the engine block may need to be formed from many sections.

Block inserts 20 and 24 include notches 34 which are configured to be aligned with projections 36 formed on blocks 18 and 22, respectively. The first and second blocks 18 and 22 cooperate to define a piston chamber 26 therebetween as best shown in FIG. 6. First and second blocks 18 and 22 illustratively include arcuate surfaces 28A, 28B, respectively, which cooperate to define the piston chamber 26 when the blocks 18 and 22 are coupled together as show in FIG. 6. In other words, block halves 12, 14 are bolted together to form an engine block which defines a toroid shaped piston chamber 26. Pistons 46 travel in a circular or orbital manner through and around piston chamber 26.

Figure 12:
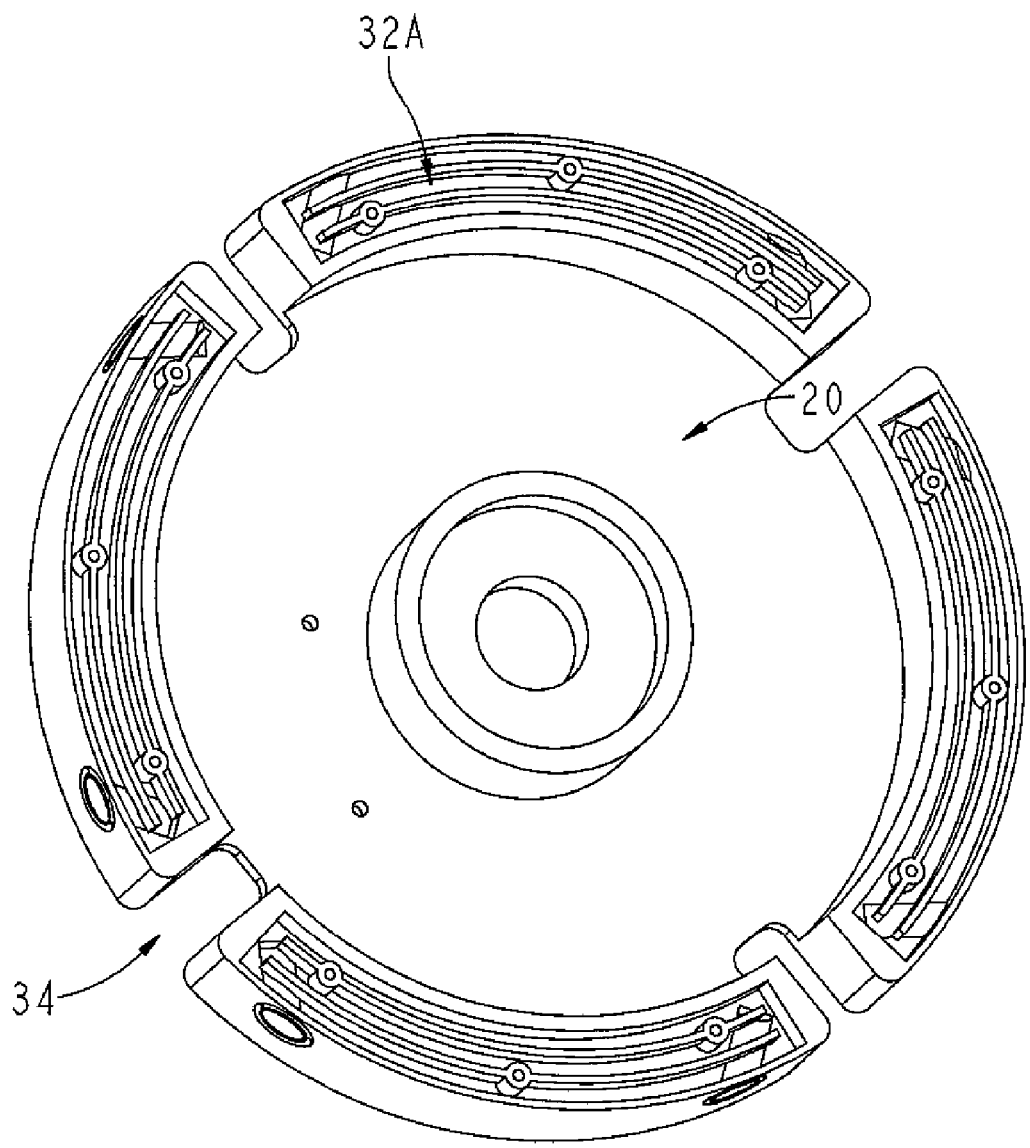
FIG. 12 illustrates a block insert of the engine of FIG. 1 illustrating cooling channels.

Blocks 18 and 22 further include cooling channels 30A, 30B located adjacent the arcuate surfaces 28A, 28B, respectively, which define the piston chamber 26 as best shown in FIGS. 5, 6, and 12. Cooling channels 30A, 30B of blocks 18 and 22, respectively, cooperate with cooling channels 32A, 32B formed in block inserts 20 and 24, respectively. Cooling channels 32A, 32B are best shown in FIGS. 5, 6 and 23. Cooling channels are therefore defined on opposite sides of the piston chamber 26 by channels 30A and 32A and channels 30B and 32B, respectively. Liquid or air is circulated in the cooling channels to cool engine 10.

Engine 10 can be air-cooled, dissipative-cooled, or liquid-cooled. Various known and conventional cooling systems (not shown) can be applied to engine 10 by those of ordinary skill in the art without undue experimentation. An exemplary dissipative-cooled system can comprise heat sinks or vanes to pull heat from the various components of engine 10. An exemplary liquid-cooled system can comprise liquid circulatory pipes or ducts much like the liquid cooling systems of conventional internal combustion engines.

Figure 13:
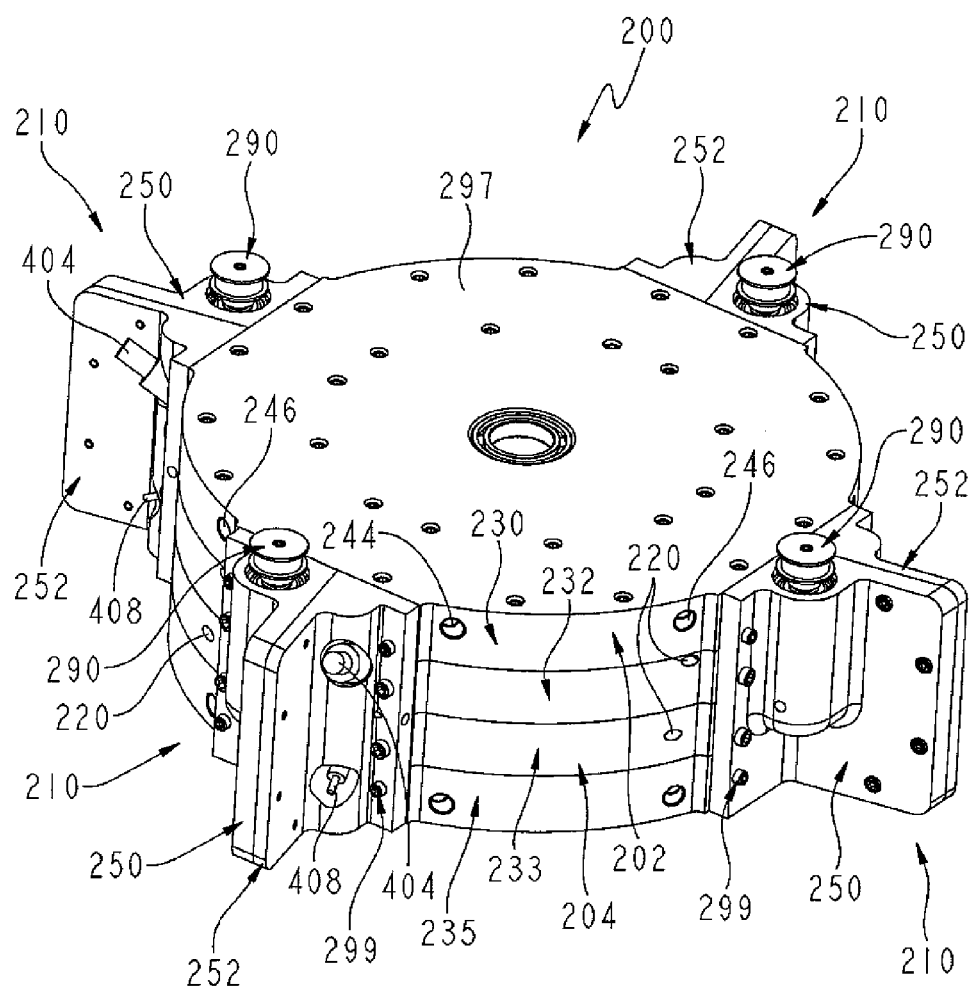
FIG. 13 is a top, perspective view of another exemplary orbital engine including a first block assembly, a second block assembly, and a plurality of modular engine valve assemblies.
Figure 14:
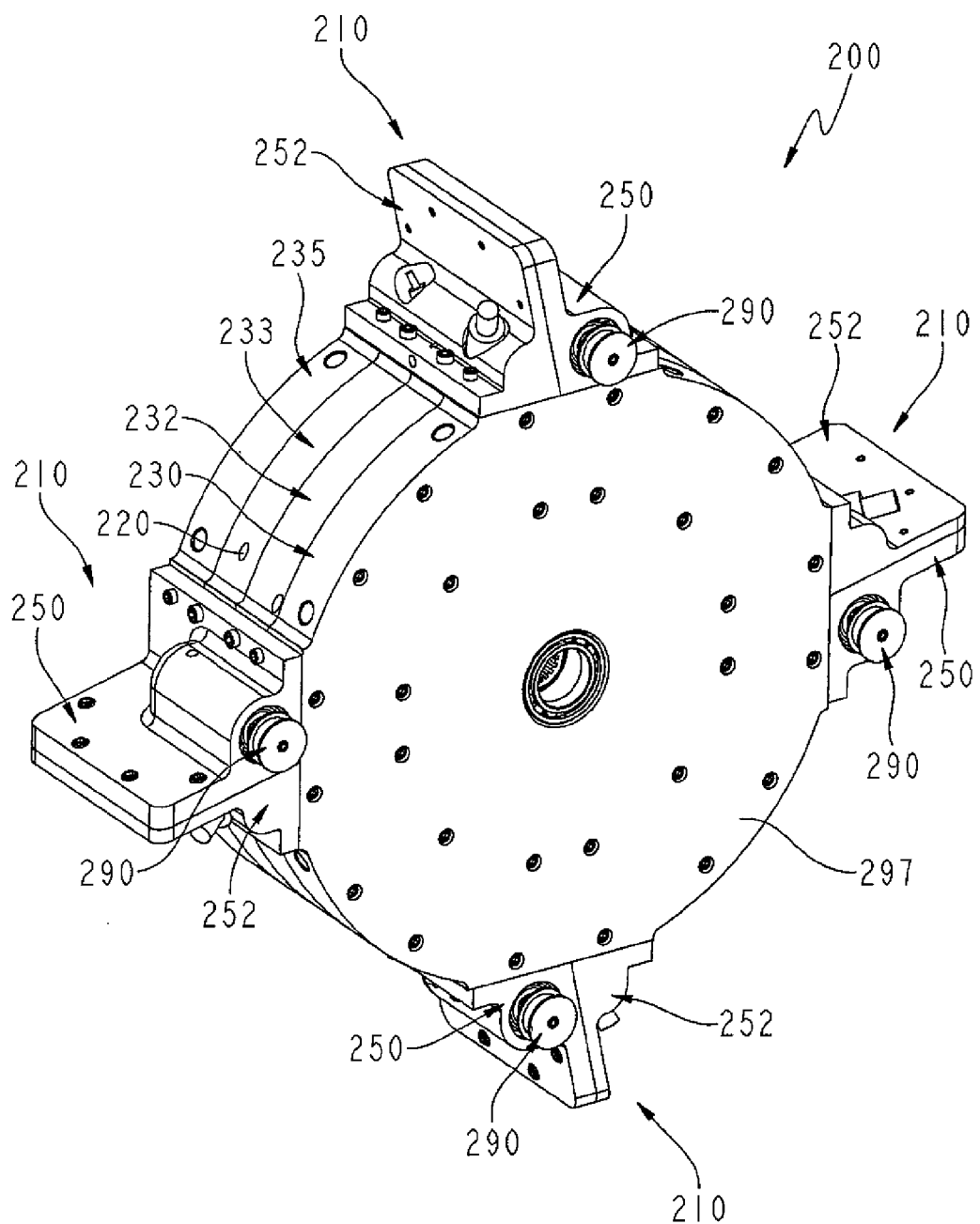
FIG. 14 is a perspective view of the engine of FIG. 13.
Figure 15:
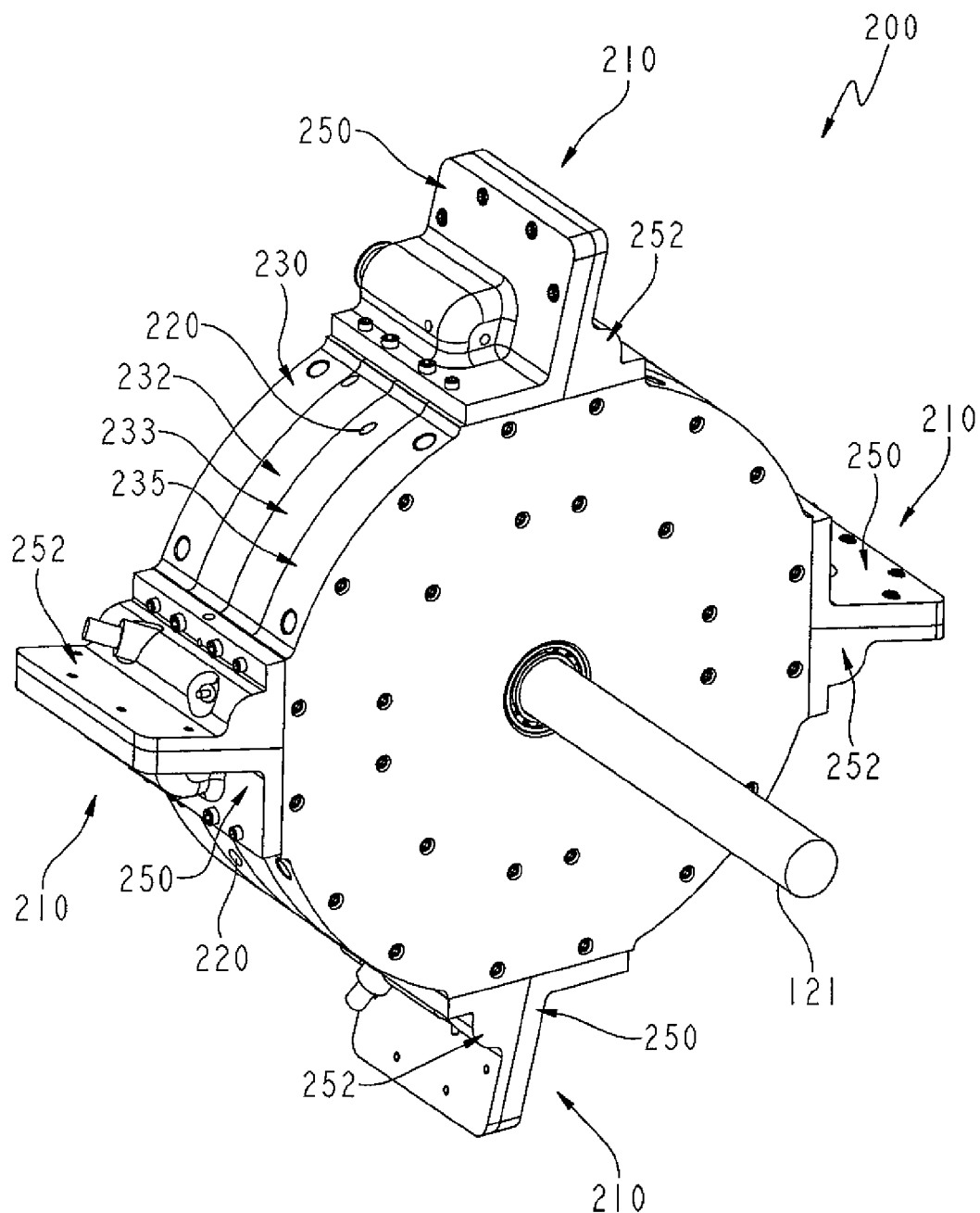
FIG. 15 is a perspective view of the engine of FIG. 13.

An exemplary air-cooled system can comprise directional vanes for directing cooling air towards the various components of engine 10. An example is shown in FIG. 19A for the engine 200 shown in FIG. 13. Referring to FIG. 19A an impellar fan 380 is coupled to engine 200. Impellar fan 380 is connected to one of connecting disc 334 or output shaft 121 through a gear system 381. Gear system 381 connects impellar fan 380 to one of connecting disc 334 and output shaft 121 and multiples the rotation rate of the one of connecting disc 334 and output shaft 121 such that impellar fan 380 has a higher rate of rotation. In one embodiment, a ring gear is supported by output shaft 121. Impellar fan 380 rotates with connecting disc 334 and directs air 382 toward and into fluid conduits 384 in block member 233. In one embodiment, the air pressure in conduits 384 is about 30 pound per square inch (psi). In one embodiment, a check valve is provided in fluid conduits 384 to permit the flow of fluid into piston chamber 206, but not out of piston chamber 206. The embodiment shown in FIG. 19A may be used in any size engine, but may be well suited for small applications wherein a liquid coolant is not practical, such as a weed eater.

In one embodiment, the number of pistons 208 is increased. A first subset of the pistons 208 operates as discussed herein to rotate connecting disc 334 and expel exhaust gas. A second subset of the pistons 208 operates to compress a charge of air introduced into the piston chamber 206 or a second piston chamber. The compressed air is then recycled back to be used by one of the pistons 208 in the first subset for combustion. In one embodiment, the compressed air is passed through a chamber outside of piston chamber 206 and reintroduced into piston chamber 206. In one embodiment, the compressed air is compressed in a second separate piston chamber (the second set of pistons are carried by a separate connecting disc) and initially introduced into piston chamber 206 to be combusted by one of the first subset of pistons 208.

Returning to engine 10, block cover 16 illustratively covers a belt drive system 38 best shown in FIGS. 9 and 10 and discussed in more detail below. Cover 16 also provides a solid foundation for another engine module 10 to be mounted in an embodiment in which multiple engine modules 10 are stacked together as discussed in detail in U.S. patent application Ser. No. 11/451,120, filed Jun. 12, 2006 and U.S. Pat. No. 7,059,294, the disclosures of which are expressly incorporated herein by reference. The multiple engine modules 10 may be connected serially to a common crankshaft or output shaft 121 to create a single engine with more power. Any desired number of engine units 10 may be connected together to create engines of more or less power.

A connecting disc 40 for coupling pistons 46 to an output shaft 121 is made from anodized aluminum. Disc 40 includes a plate 42 having mounting portions 44 for a plurality of pistons 46. Connecting disc 40 further includes a center mounting portion 48 for connecting to an output shaft 121 to transmit power from the engine 10 to another device. Connecting disc flanges 50 are coupled to opposite sides of connecting disc 40. Illustratively, flanges 50 are steel parts made by Grob, Inc. Flanges 50 have internal splines which match up with the output shaft 121 that extends through the center of the engine 10 and outward axially. The flanges 50 are illustratively bolted to the connecting disc 40. As shown in FIG. 5, two identical flanges 50 are coupled to opposite sides of the disc 40. Flanges 50 extend into central bearing portions 52A and 52B of blocks 18 and 22, respectively. The output shaft 121 is illustratively a steel shaft which connects the disc 40 and flanges 50 to an external device.

The blocks 18 and 20 also include housing portions 60A and 60B which define housings for receiving four identical chambering discs or valves 62. The chambering valves 62 are illustratively formed from a steel plate. In one embodiment, the chambering valves are made of magnesium. A steel bushing 64 is illustratively mounted to one side of each chambering valve 62 to provide more contact area for a splined shaft 66 which extends through the chambering valve 62. It is understood that components 62, 64 and 66 may be made as one piece, if desired. The chambering valves 62 each have notches or openings 68 and 70 formed on opposite sides to permit the pistons 46 to pass through the valves 62. It is understood that a single opening may be provided in chambering valves 62, if desired.

Chambering valves 62 are mechanically connected to the output shaft 121 by the belt drive assembly 38 or an equivalent mechanism such that the chambering valves 62 rotate in a coordinated manner with output shaft 121 as discussed below. Those of ordinary skill in the art may design the appropriate mechanical and gearing linkages, or other types of linkages, between the output shaft 121 and chambering valves 62 such that notches 68, 70 rotate through piston chamber 26 as a piston 46 approaches and passes by chambering valve 62 within piston chamber 26.

Figure 11:
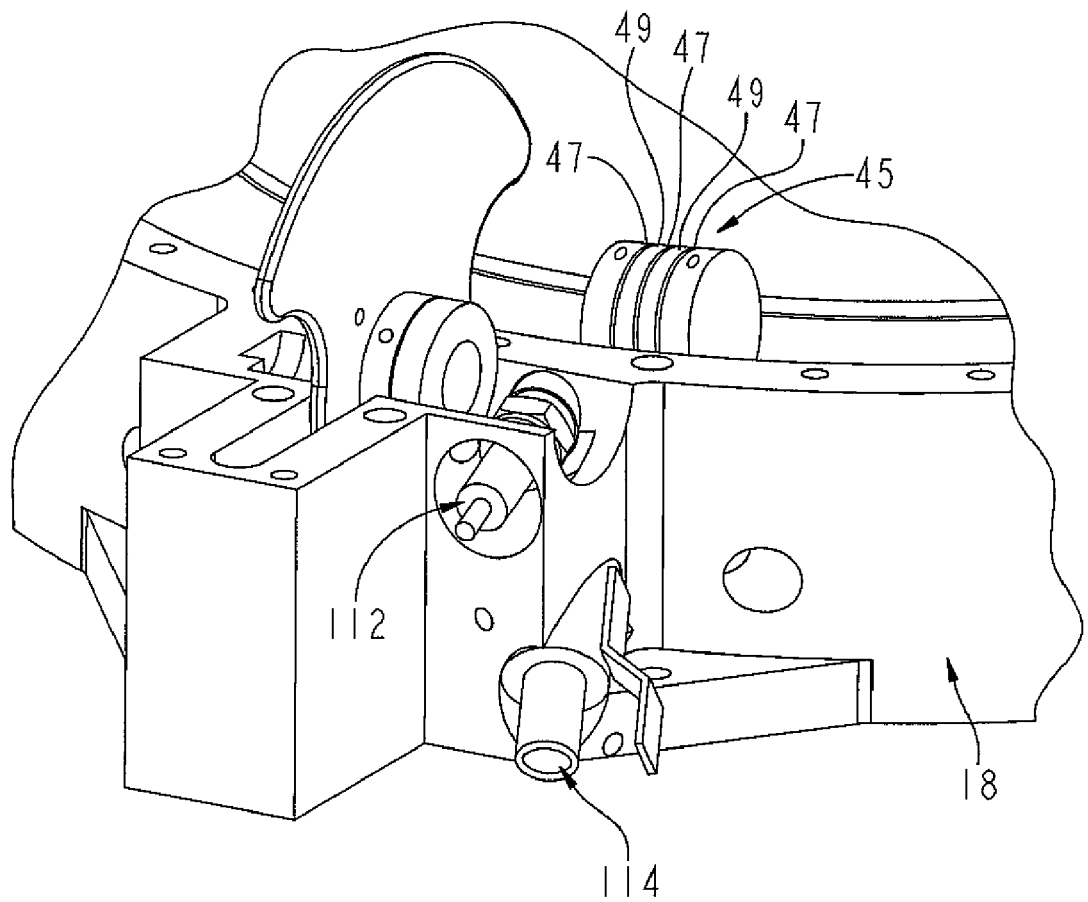
FIG. 11 illustrates a piston assembly and engine valve assembly of the engine of FIG. 1.

The pistons 46 are illustratively coupled to mounting flanges 44 of connecting disc 42 by two roll pins. Pistons 46 are illustratively formed from aluminum. Piston 46 illustratively includes two faces which are mounted to a piston body with roll pins. The piston ring assemblies is made from a carbon/graphite composite material and has three ring contact areas. The center contact area is located radially outward further since it has an arch further from the inside edge of the piston. Details of the pistons 46 are best shown in FIG. 11. The piston ring assembly 45 maintains at least two contact areas 47 (illustratively three contact areas separated by lower regions 49) in contact with the surface of the piston chamber as the piston 46 rotates over a gap in the piston chamber corresponding to the location of the chambering valve.

The illustrated embodiment includes four pistons 46 and four chambering valves 62. It is understood that in an alternative embodiment, multiple chambering valves 62 may be provided per piston 46. In another alternative embodiment, multiple pistons 46 may be provided per chambering valve 62. Further, in a multiple module configuration, each module can have one or more pistons 46 and one or more chambering valves 62, as long as the piston locations are staggered to create a balanced force. Likewise, depending on size, weight and other factors, a single piston 46, single chambering valve 62 engine may be used.

Seals are provided to seal the connecting disc 42 to the first and second blocks 18 and 22. A first seal located between the connecting disc 42 and block 18 is illustratively a carbon/graphite seal. This seal helps keep the connecting disc 42 straight as well as provide a secondary sealing area for any outer seal blow by. A second seal located between the connecting disc 42 and block 22 is illustratively a large carbon/graphite seal. This seal has two sealing contact rings and has notches to receive the chambering disc seal. There are two chambering carbon/graphite seals per chambering disc 42. Seals have a center hole for bearing and seal locations. Additionally there is a hole with a slot that allows the piston to pass through.

Blocks 18 and 22 are each formed to include first and second coolant openings 80 and 82. Illustratively, four such openings 80, 82 are provided on each block 18, 22. Block inserts 20 and 24 also each include four sets of coolant openings 84 and 86 aligned with coolant openings 80 and 82 and blocks 18 and 22, respectively. In other illustrated embodiments, fewer coolant openings may be provided to circulate coolant within the engine 10. Coolant is illustratively circulated using conventional pumps and cooled using conventional radiators or other heat transfer mechanisms.

Figure 1:
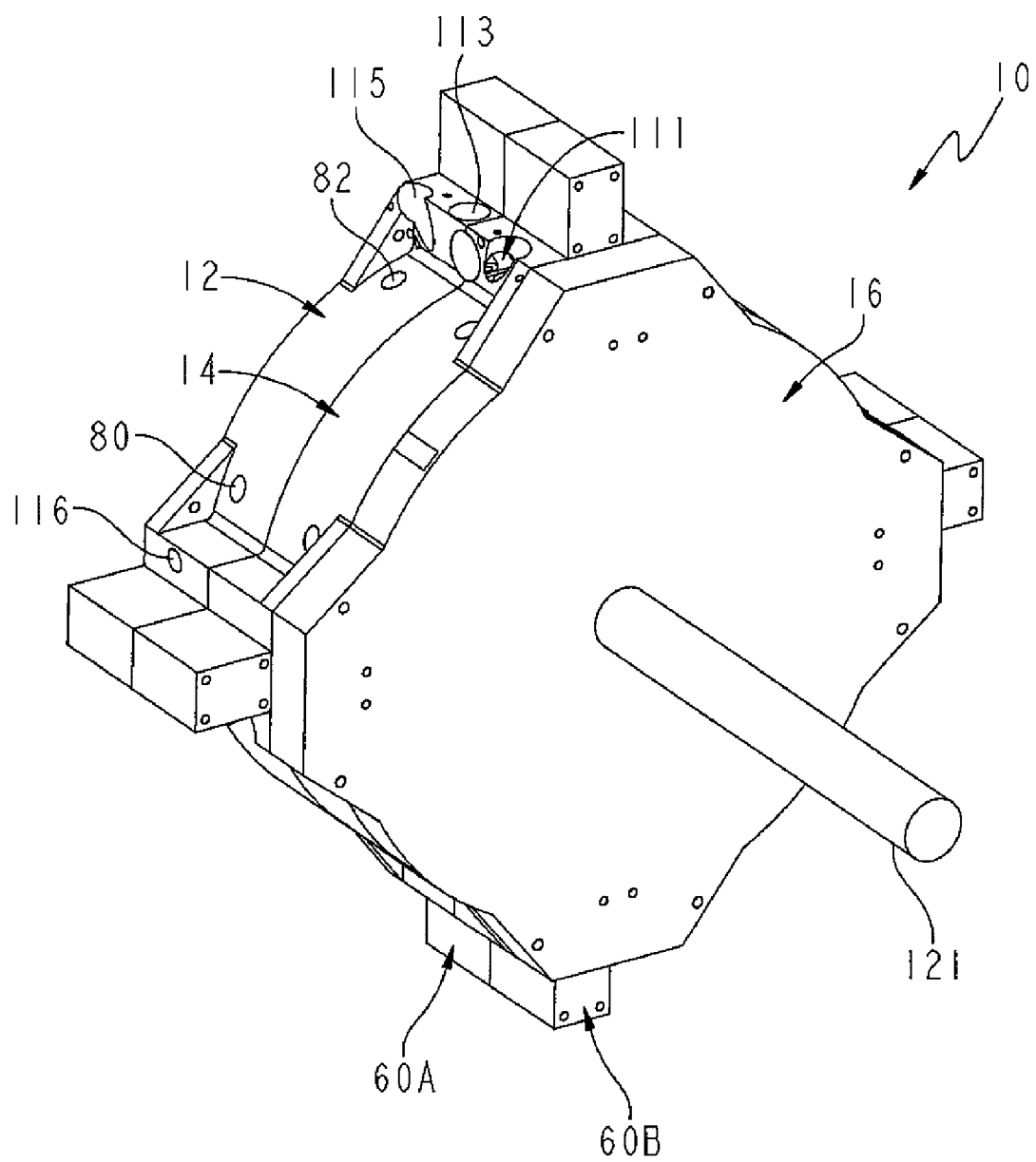
FIG. 1 is a perspective view of an exemplary embodiment of an engine.
Figure 2:
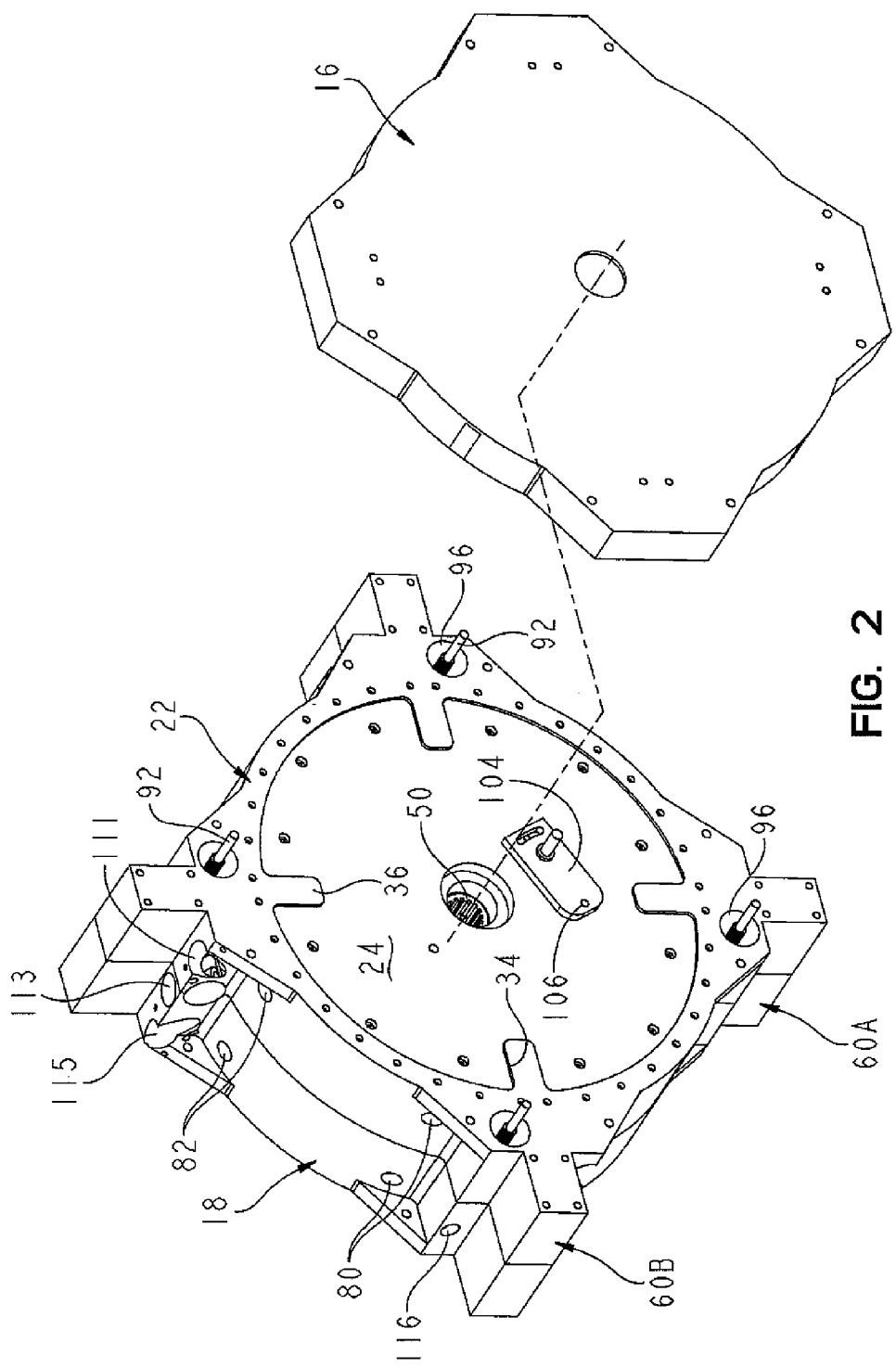
FIG. 2 is a perspective view of the engine of FIG. 1 with a cover exploded.
Figure 3:
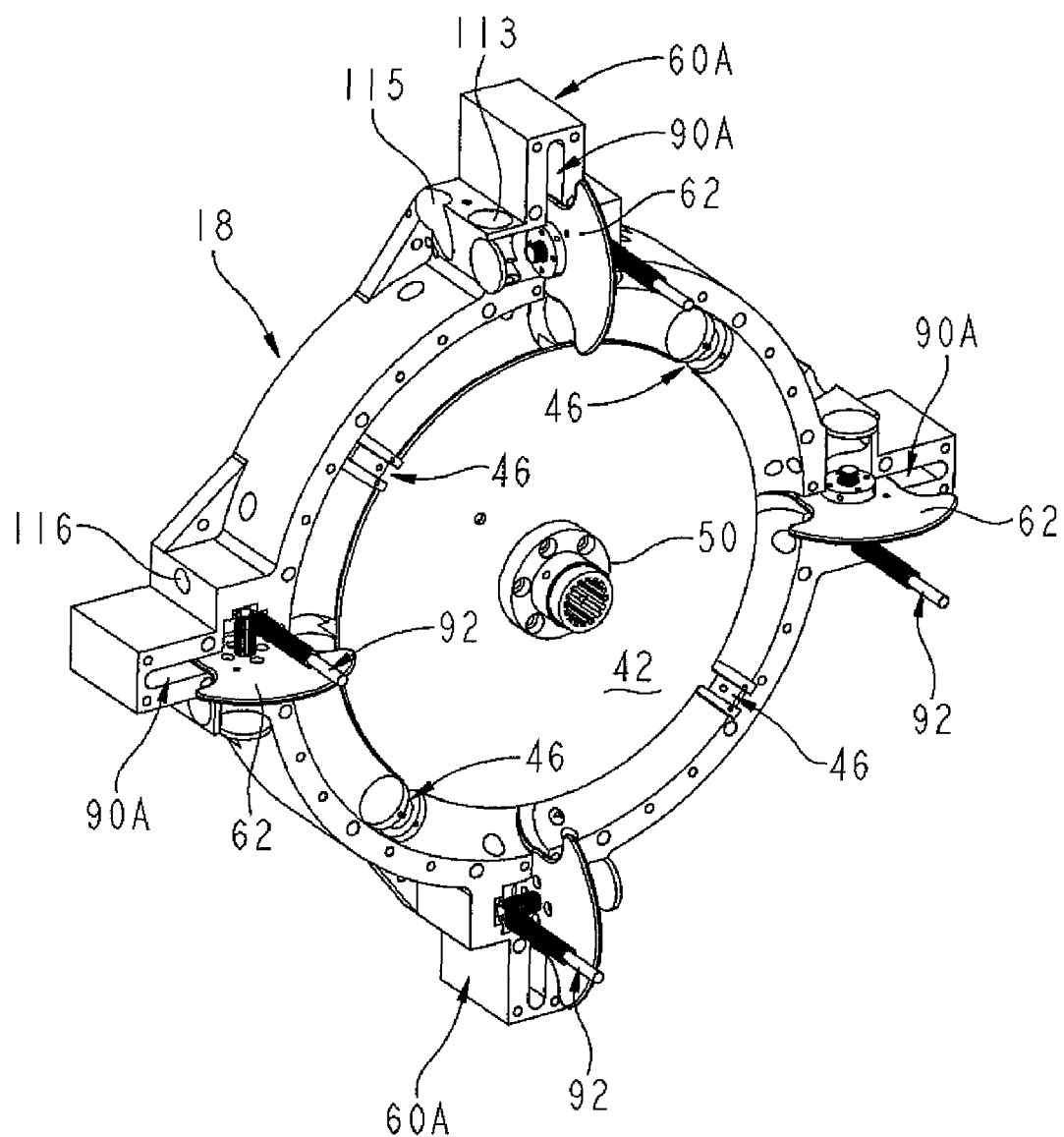
FIG. 3 is a perspective view of the engine of FIG. 1 illustrating a lower engine block, a connecting disc supporting a plurality of pistons, and a plurality of engine valves.
Figure 4:
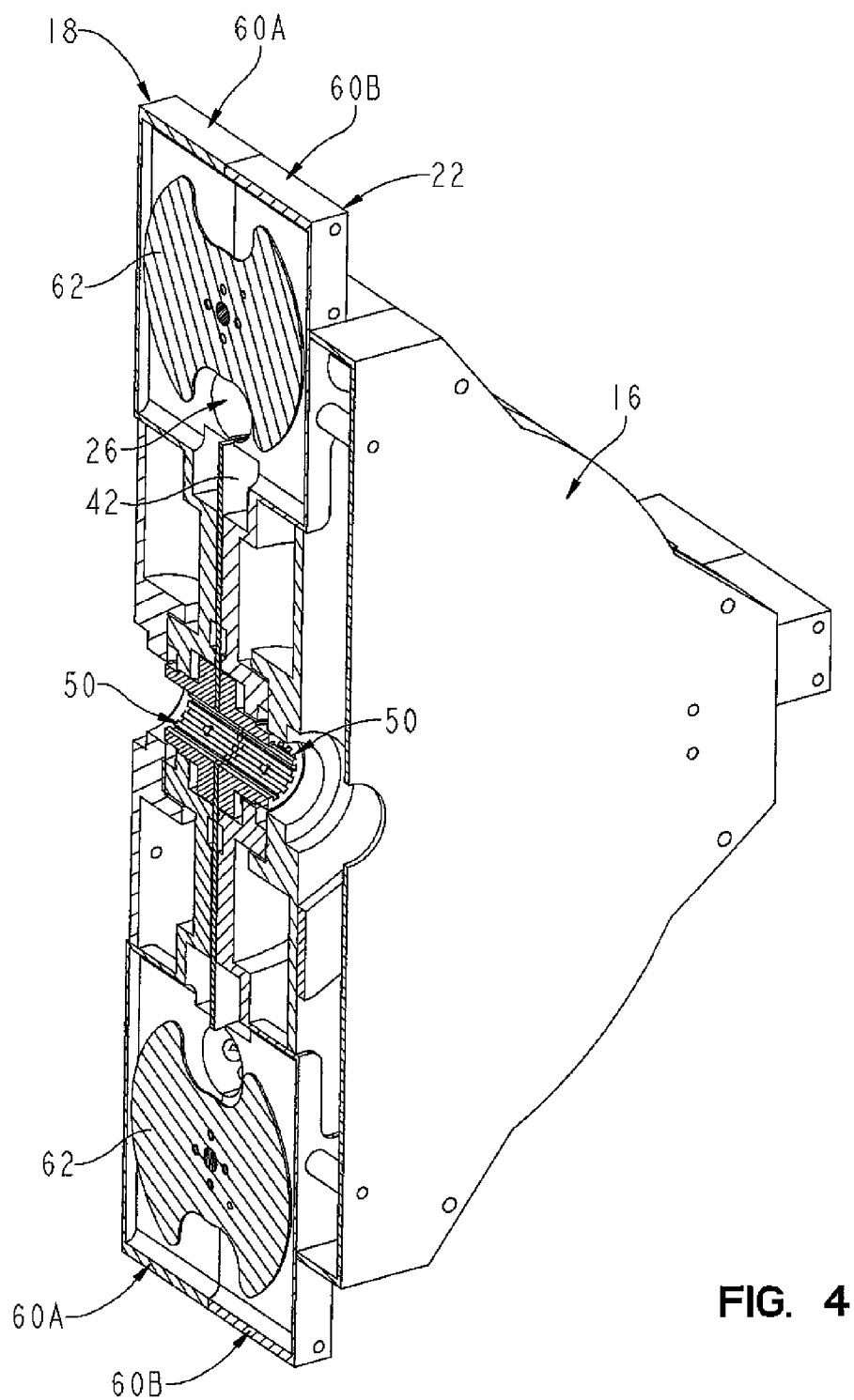
FIG. 4 is a perspective view of the engine of FIG. 1 with a section taken through two engine valves.

As shown in FIG. 3, the chambering valves 62 are located in slots 90A formed in housings 60A of block 18. Valve drive shafts 92 extend generally perpendicularly to shafts 66 of chambering valves 62. Valve drive shafts 92 have a gear portion 94. Gear portion 94 is preferably a bevel gear which meshes with a bevel gear 65 on shaft 66. Drive shafts 92 illustratively extend through apertures 96 formed in second block 22 as best shown in FIG. 2.

Figure 9:
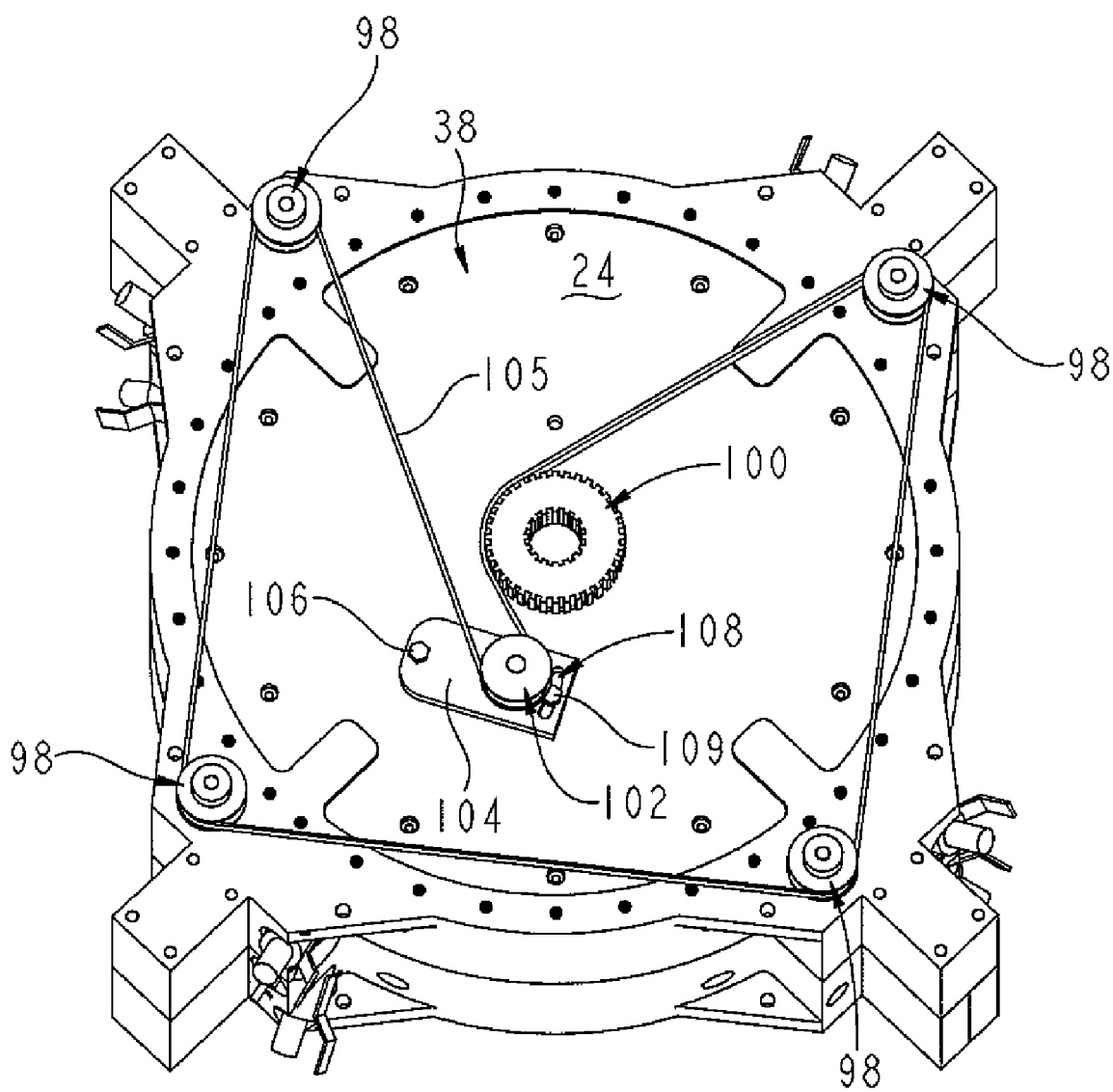
FIG. 9 is a top, perspective view of the engine of FIG. 1, illustrating a drive system coupling the engine valves to a main output shaft.
Figure 10:
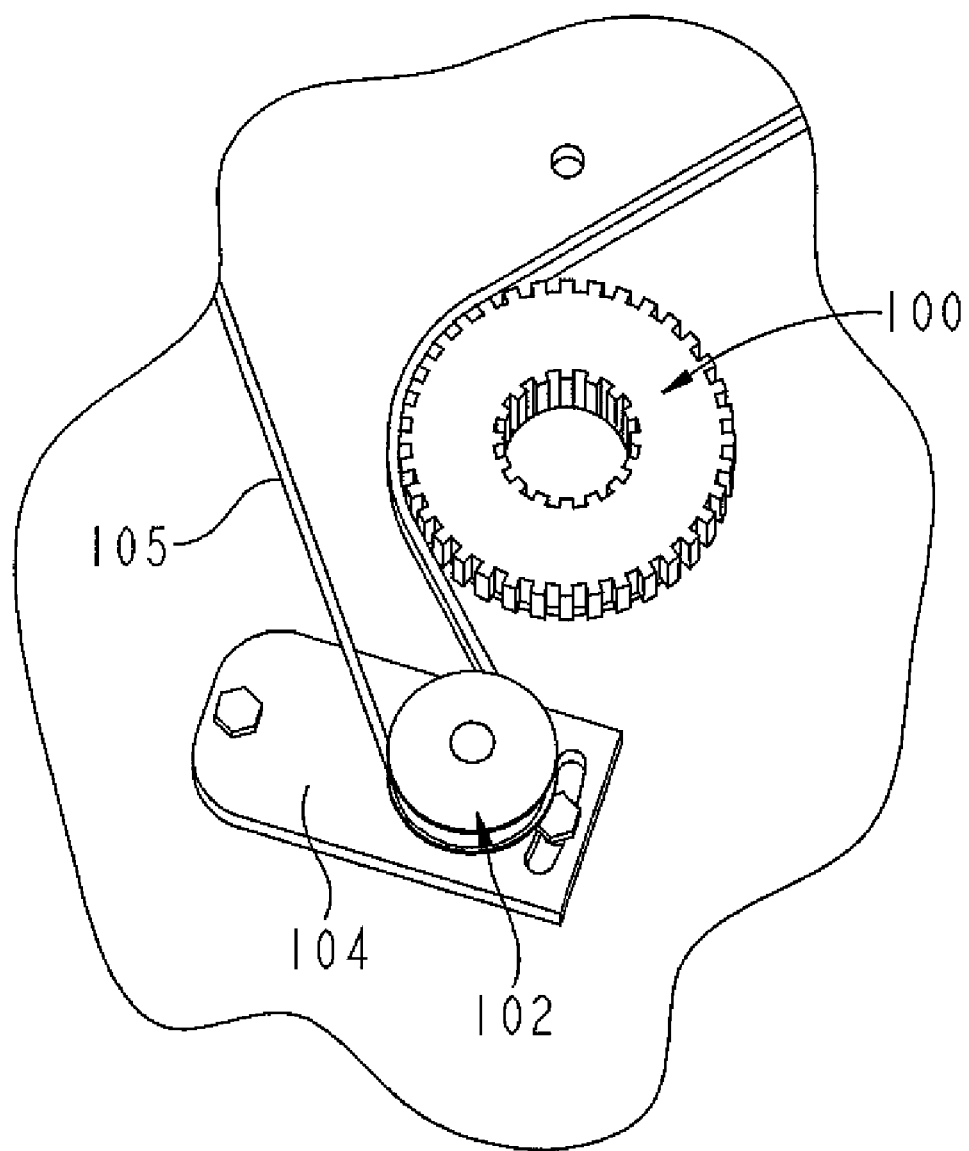
FIG. 10 is a detail view of a gear coupled to the main output shaft and an idler gear.

A belt drive system 38 best shown in FIGS. 9 and 10 is used to rotate the shafts 92 which in turn rotate the chambering valves 62 within the housings 60A and 60B. As shown in FIGS. 9 and 10, gears 98 are coupled to each of the shafts 92. A central gear 100 is located on the main output shaft 121. An idler wheel 102 is also provided. A drive belt 105 having a plurality of teeth engages gears 98, 102. Location of idler wheel 102 is adjustable by a plate 104 having a first end pivotably coupled to the block insert 24 by fastener 106. As opposite of end plate 104 includes a slot 108 which receives a fastener 109. Therefore, the plate 104 may be pivoted about fastener 106 to adjust the tension of belt 105 using idler wheel 102. Cover 16 is located over the belt drive system 38. It is understood that any suitable gear drive or belt drive system may be used to rotate the chambering disc 62 as long as the system provides accurate and reliable timing.

Various components are provided with locating pin holes. This makes initial timing of the connecting disc 40 with the chambering valves 62 easier and more accurate. It is understood that housings 60A, 60B including the seals, gearing, and the like may be separate pieces bolted on to the remainder of the blocks 18, 22. Such separate pieces may facilitate assembly and repair of the engine 10.

Figure 8:
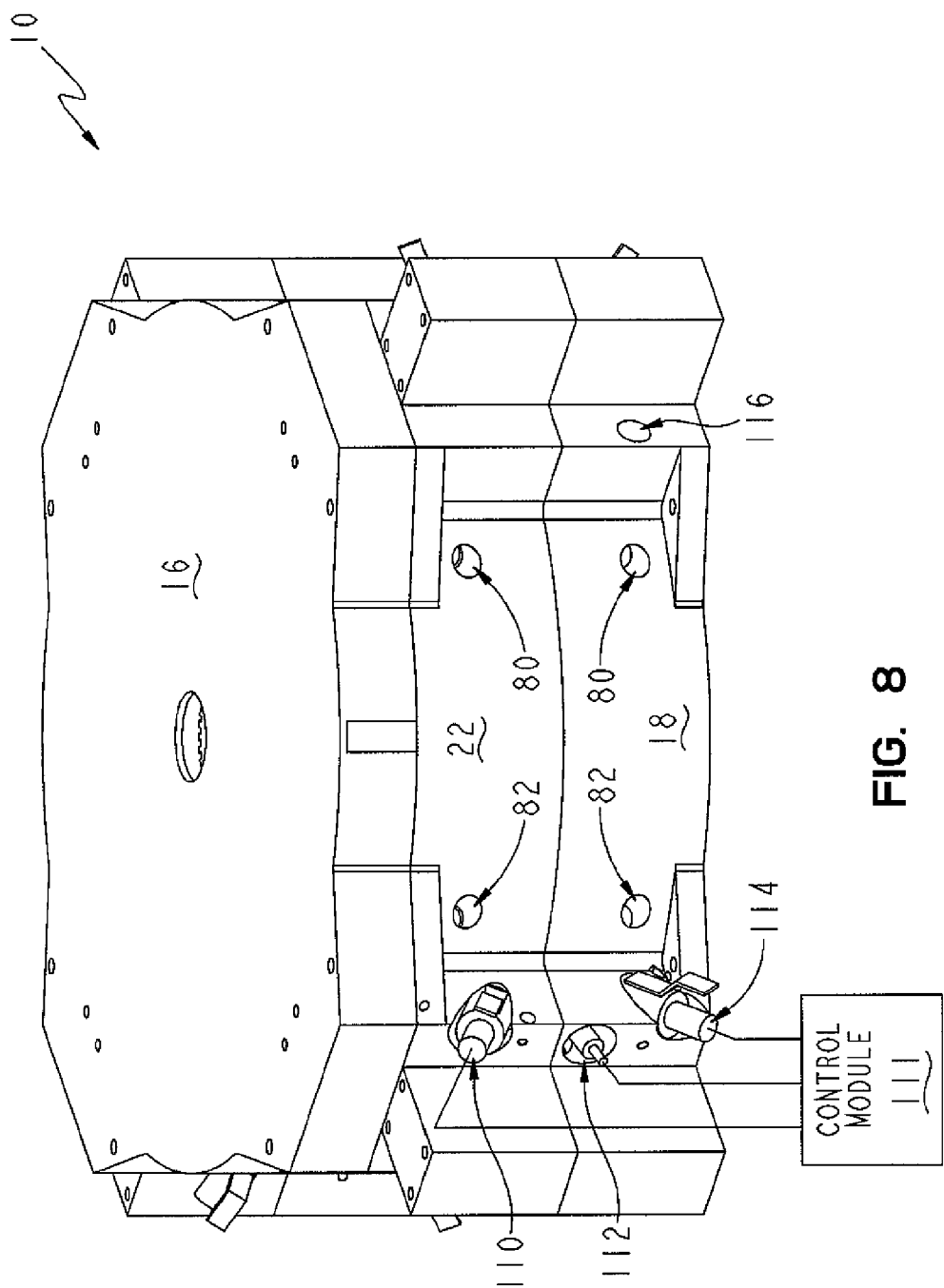
FIG. 8 is a side, perspective view of the engine of FIG. 1, including a fuel injector, an air injector, and an ignition member.

FIG. 8 illustrates an air injector 110 coupled to an inlet port formed in the second block 22. A spark plug 112 and a fuel injector 114 are coupled to respective ports formed in first block 18. Air injector 110, spark plug 112 and fuel injector 114 are in communication with the piston chamber 26. It is understood that the positions of the fuel injector 114 and air injector 110 can be reversed. In an illustrated embodiment, a direct fuel injector is used to inject fuel and a standard fuel injector is used to inject air. In addition, a single injector for fuel and air may be used to deliver an air/fuel mixture directly into the piston chamber 26.

An air injector 110, spark plug 112 and fuel injector 114 set is provided adjacent each chambering valve. Therefore, in the illustrated embodiment, four such sets are provided.

The air/fuel mixture is illustratively injected into ignition chamber area of the piston chamber 26 by air injector 110 and fuel injector 114. The air/fuel injection system is timed or connected with the rotation of the output shaft 121 and/or chambering valves 62 by mechanical, electrical, electronic, or optical means, or the equivalent.

Block 18 is formed to include exhaust ports 116 adjacent each chambering valve 62 as shown in FIGS. 1-3 and 8. Exhaust gases emitted from exhaust ports 116 is preferably directed through an exhaust system (not shown) to the atmosphere or to an exhaust remediation system. Conventional exhaust components such as catalytic converters and mufflers can be incorporated as desired or necessary.

The volume of the piston chamber 26 located between a closed chambering valve 62 and a rear side of a piston 46 is illustratively an ignition chamber area, which incorporates the intake ports 111, 115, 113 of injectors 110, 114 and the spark plug 112, respectively. At the moment (or slightly after) the chambering valves 62 rotate to close off piston chamber 26, the spark plug 112 causes the air/fuel injected into piston chamber 26 by injectors 110, 114 to explode (burn) in ignition chamber area causing a rapid expansion of the combustion gases, as in conventional internal combustion engines, imparting power to pistons 46. This forces pistons 46 to continue traveling in the same direction of rotation, which in turn is transmitted via connecting disc 40 to the output shaft 121. Chambering valves 62 still are closing off piston chamber 26 during this step.

As the pistons 46 continue their powered travel through piston chamber 26, exhaust gases from a preceding combustion ahead of them are forced from the piston chamber out of exhaust ports 116. Chambering valves 62 still are closing off piston chamber 26 during this step. The volume of the piston chamber 26 located between the closed chambering valve 62 and the front side of a piston 46 is illustratively an exhaustion chamber area, which incorporates an exhaust port 116. As pistons 46 move closer to chambering valves 62 (that is, each piston 46 is moving closer to the next sequential chambering valve 62), a notch 68 or 70 of chambering valve 62 rotates into piston chamber 26 allowing pistons 46 to pass through notch 68 or 70.

During assembly of the connecting disc 40 assembly, the connecting disc flanges 50 are mounted to the connecting disc plate 42 with six screws. Next, the piston bodies are mounted to the connecting disc mounting tabs 44 with two roll pins each. One piston face is mounted to the piston body, or alternatively, it can be mounted just prior to mounting the body to the connecting disc. A piston ring seal is then positioned onto the piston body. The opposite piston face is then installed.

The chambering valve assembly is illustratively constructed as follows: Start by installing the bevel gears onto the horizontal and vertical splined shafts 66, 92 with roll pins. Press a small bearing onto the horizontal shaft end, and medium bearings onto the vertical shaft, separated with a spacer. Press the vertical shaft assembly into the block. Press oil seal into chambering valve seal nearest the small bearing. Insert the bevel gear on the horizontal shaft into the oil seal. Slide the chambering valve 62 into place, with the flange away from the miter gear. Put the opposite chambering disc seal on and then press a medium bearing onto the end of the horizontal splined shaft.

Engine block assembly is illustratively constructed as follows: Press the large bearings into the block and block insert locations. Install the connecting disc seals into the block 22. Next, take the chambering valve assemblies and slide them onto the connecting disc at the same time. Then lower the entire rotating assembly into the block 22, ensuring the center shaft presses into the large (flange) bearing. Once the block 22 is ready, stand it on an edge, along with the block 18. Install the block seals into the block 18, being careful to not let them fall out. Slide the two block halves 18, 22 together. Bolt the two halves together. Install the spark plugs 112 and injectors 110, 114.

An Electromotive TEC3r programmable fuel injector and ignition control module 111 is illustratively used to control injectors 110, 114 and spark plugs 112. The module 111 independently controls both the fuel and air injectors 114, 110, as well as the spark plugs 112.

The engine may be operated in multiple modes depending on required power. In a High power mode, all pistons are fired simultaneously at each chamber location. The illustrated embodiment has four pistons 46 and four chamber areas. Therefore, in this illustrated embodiment, there are up to sixteen ignitions per revolution of the connecting disc 40.

In a Moderate power mode all pistons are illustratively fired at every other piston chamber location. In a Light power mode, alternate pistons 46 are illustratively fired at alternate piston chamber locations. In an Idle mode, two pistons 46 are illustratively fired every other revolution.

It is understood that there are many variations of power output combinations. When a piston does not fire at every chamber location, it could skip any number of chambers. For example, in an illustrated embodiment, a piston 46 may be fired at 90°, 180°, 270°, 360°, 450°, etc. The fuel and air injectors 114, 110 may have the possibility of firing multiple times per combustion cycle. For example, if there is more time/piston travel available, a second dose of fuel air could be injected as the initial combustion is diminishing to revitalize the combustion.

For production, a cutting tool that fits where the piston 46 is located is preferred. This cutter is coupled to a drive mechanism; either mechanical or hydraulic that rotates cutting tips where the piston rings would be located. Then, during casting of the engine block or machining of the engine block, the piston chamber is slightly smaller in diameter than desired. The engine would be assembled with the cutting/finishing 'pistons'. These cutting/finishing 'pistons' would complete the final boring/honing of the 'cylinder' area of the piston chamber. In one embodiment, a power source includes a connection to the cutting tools of cutting/finishing 'pistons' through a bore in the connecting disc. Once the final boring is completed. The block members would be disassembled and cleaned. The block members would then be assembled again along with working pistons 46 positioned in the piston chamber.

This engine 10 has increased horsepower and torque. The torque increase is a result of a longer torque arm. This engine can turn at higher revolutions per minute without detrimental changes of direction of the pistons, and therefore is less self-destructing. There is no reciprocating mass and the valve train is not restricted by the revolutions per minute of the engine. This engine also has a decreased level of complexity when compared to current engines, has fewer moving parts, and easier maintenance. This engine further has less internal friction and, as a result, can utilize needle, roller, or ball bearings rather than plain bearings found in conventional engines.

This engine has a higher power to weight ratio, meaning it can be smaller and have a decreased weight for the amount of power generated. The structure of this engine can be less rigid and use less material. As a result, this engine can be scaled up or down in size for use in a variety of devices, from small-sized gardening equipment such as weed trimmers and lawn mowers, to medium-sized engines such as motorcycle engines and electrical generators, to large-size automotive engines, to even larger-sized locomotive, ship, and power plant engines.

Further, this engine is modular in design in that several engine units can be stacked together to create a multi-unit design, analogous to multi-cylinder conventional engines. This modular design makes it easier to add performance by simply adding additional units, decreases the cost of manufacturing as each unit can be identical, and makes it easier maintain as individual units can be replaced upon malfunction.

Referring to FIGS. 13-31, another exemplary embodiment of an orbital engine 200 is shown. Engine 200 may operate in the same manner as engine 10 and/or as disclosed in U.S. patent application Ser. No. 11/451,120, filed Jun. 12, 2006 and U.S. Pat. No. 7,059,294, the disclosures of which are expressly incorporated herein by reference.

Engine 200 includes an first block assembly 202 and a second block assembly 204. As described herein first block assembly 202 and second block assembly 204 cooperate to define a piston chamber 206 (see FIG. 19) through which a plurality of pistons 208 (see FIG. 19) move. Engine 200 further includes a plurality of modular engine valve assemblies 210. Each of the modular engine valve assemblies 210 support an engine valve 212 (see FIG. 16) which cooperates with piston chamber 206 and plurality of pistons 208 to form one or more ignition chamber areas and exhaust chambers. Illustratively, four modular engine valve assemblies 210 are shown. In one embodiment of engine 200, at least one engine valve 212 are provided for one or more of plurality of pistons 208. In one embodiment of engine 200, at least one plurality of pistons 208 are provided for one or more of engine valve 212. In one embodiment, an equal number of pistons 208 and engine valves 212 are provided. In one embodiment, a greater number of pistons 208 are provided than engine valves 212. In one embodiment, a greater number of engine valves 212 are provided than pistons 208.

Modular engine valve assemblies 210 each support a fuel injector 216 and an ignition member 218. The modular engine valve assemblies 210 and one or both of first block assembly 202 and second block assembly 204 cooperate to bring fuel injector 216 and ignition member 218 into communication with piston chamber 206. One of first block assembly 202 and second block assembly 204 includes an air inlet 220 (block member 232 of block assembly 202) through which pressurized air is introduced into piston chamber 206. One of first block assembly 202 and second block assembly 204 includes an exhaust outlet 222 (illustratively block member 233 of block assembly 204) through which exhaust gases are removed from piston chamber 206. Although various components of first block assembly 202, second block assembly 204, and the plurality of modular engine valve assemblies 210 are shown including fuel injector 216, ignition member 218, air inlet 220, and exhaust outlet 222, any arrangement is permissible as long as fuel and air are provided between plurality of pistons 208 and valves 212 to be combusted.

In one embodiment, first block assembly 202 and second block assembly 204 are each divided into four quadrants. In this embodiment, the engine valve assemblies 210 are formed integral with the first block assembly 202 and the second block assembly 204, such as engine 10.

First block assembly 202 includes a first block member 230 and a second block member 232. Second block member 232 includes a surface 234 (see FIG. 19) which forms a portion of piston chamber 206. Surface 234 is a generally semicircular shape and forms a toroidal recess about a longitudinal axis 236 of engine 200. Block member 233 includes a surface 305 (see FIG. 19) which also forms a portion of piston chamber 206. Surface 305 is a generally semicircular shape and forms a toroidal recess about a longitudinal axis 236 of engine 200. Pistons 208 rotate through piston chamber 206.

First block member 230 further includes a plurality of recesses 238. Second block member 232 also includes a plurality of recesses 240. Recesses 238 and recesses 240 cooperate to form cooling channels 242 through which a fluid is passed to remove heat from piston chamber 206. Exemplary fluids include air and liquid. First block member 230 includes a fluid inlet 244 (see FIG. 13) and a fluid outlet 246 (see FIG. 13) through which a cooling fluid is introduced to cooling channels 242 and is removed from cooling channels 242, respectively.

Figure 23A:
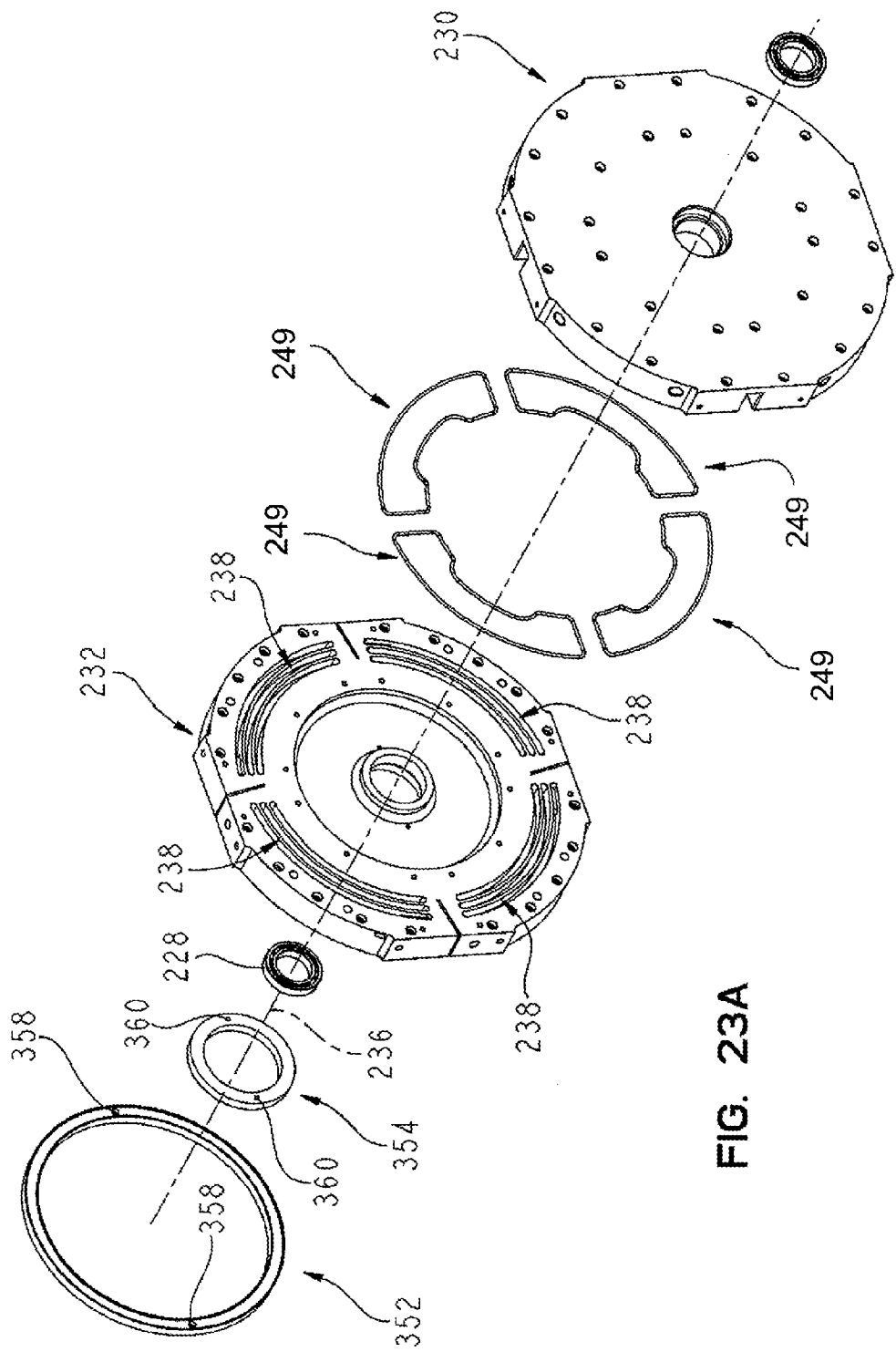
FIGS. 23A-C are an exploded view of components of the engine of FIG. 13.

Referring to FIG. 23A, four instances of plurality of recesses 238 are shown. A corresponding number of plurality of recesses 240 are provided in second block member 232. A corresponding seal 249 is provided for each pair of plurality of recesses 238 and plurality of recesses 240. Seal 249 is illustratively an o-ring. Seals 249 are received in grooves 307 in respective block members 230 and 235 (illustrated for block member 230 in FIG. 29 and shown in FIG. 19).

Figure 16:
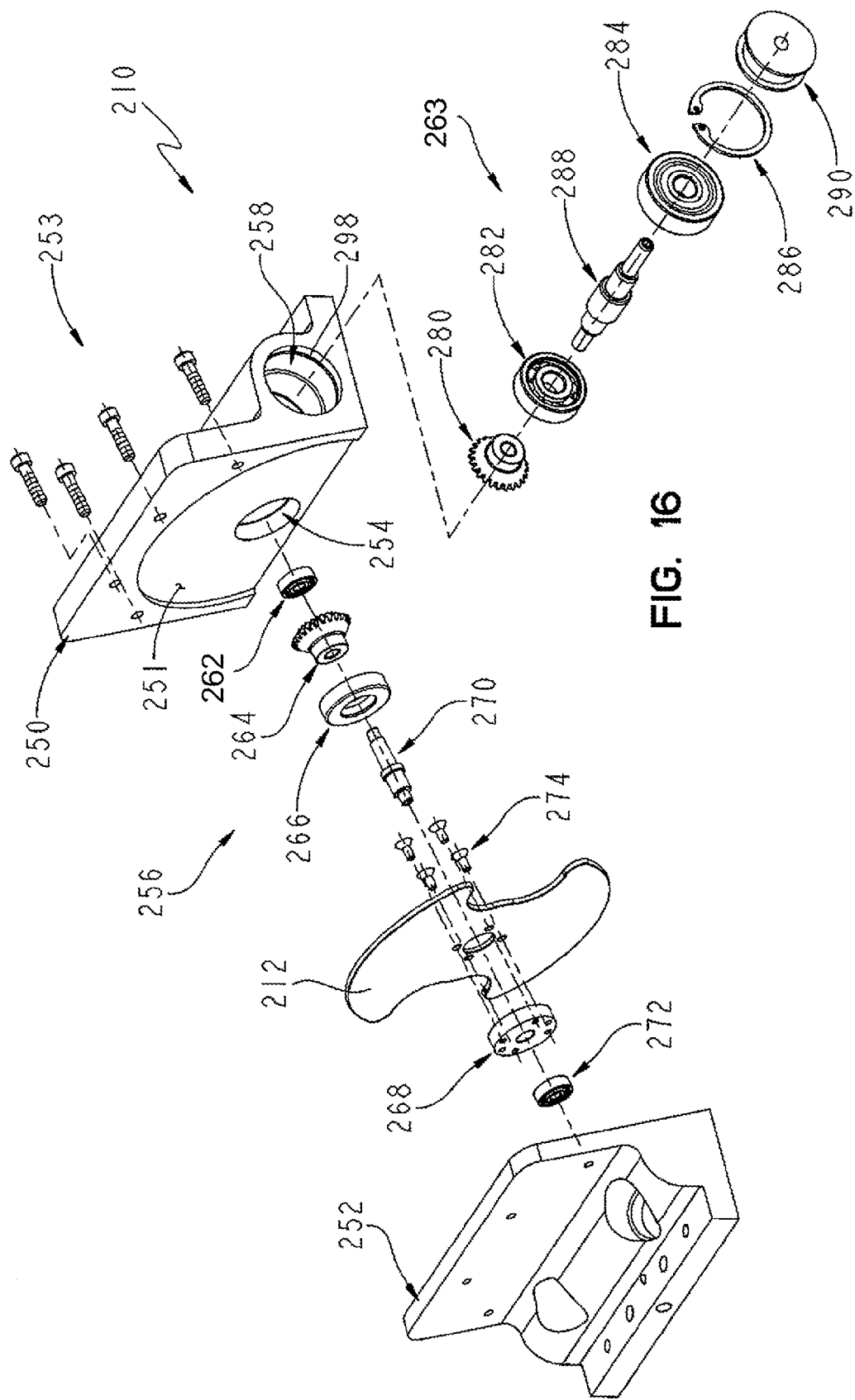
FIG. 16 is an exploded assembly view of a modular engine valve assembly.

Referring to FIG. 16, one of the modular engine valve assemblies 210 is shown. Plurality of modular engine valve assemblies 210 includes a first base member 250 and a second base member 252. First base member 250 includes a recess 251 for receiving engine valve 212. First base member 250 further includes a first bore 254 sized to receive an engine valve support assembly 256 and a second bore 258 sized to receive a valve to drive system coupling assembly 260.

Engine valve support assembly 256 includes a first bearing 262, a first gear 264, a seal 266, engine valve 212, a bushing 268, a shaft 270, a second bearing 272, and a plurality of couplers 274. Bushing 268 is coupled to engine valve 212 through plurality of couplers 274. Bushing 268 is coupled to shaft 270 so that engine valve 212 rotates with shaft 270. In one embodiment, bushing 268 and shaft 270 have interlocking spline features. In one embodiment, shaft 270 and valve 212 are a single component. Seal 266 is positioned adjacent engine valve 212 on the opposite side of bushing 268. First gear 264 is positioned adjacent seal 266 and is supported by shaft 270. First gear 264 is coupled to shaft 270 so that shaft 270 rotates with first gear 264. First bearing 262 and second bearing 272 support opposite ends of shaft 270.

Figure 17:
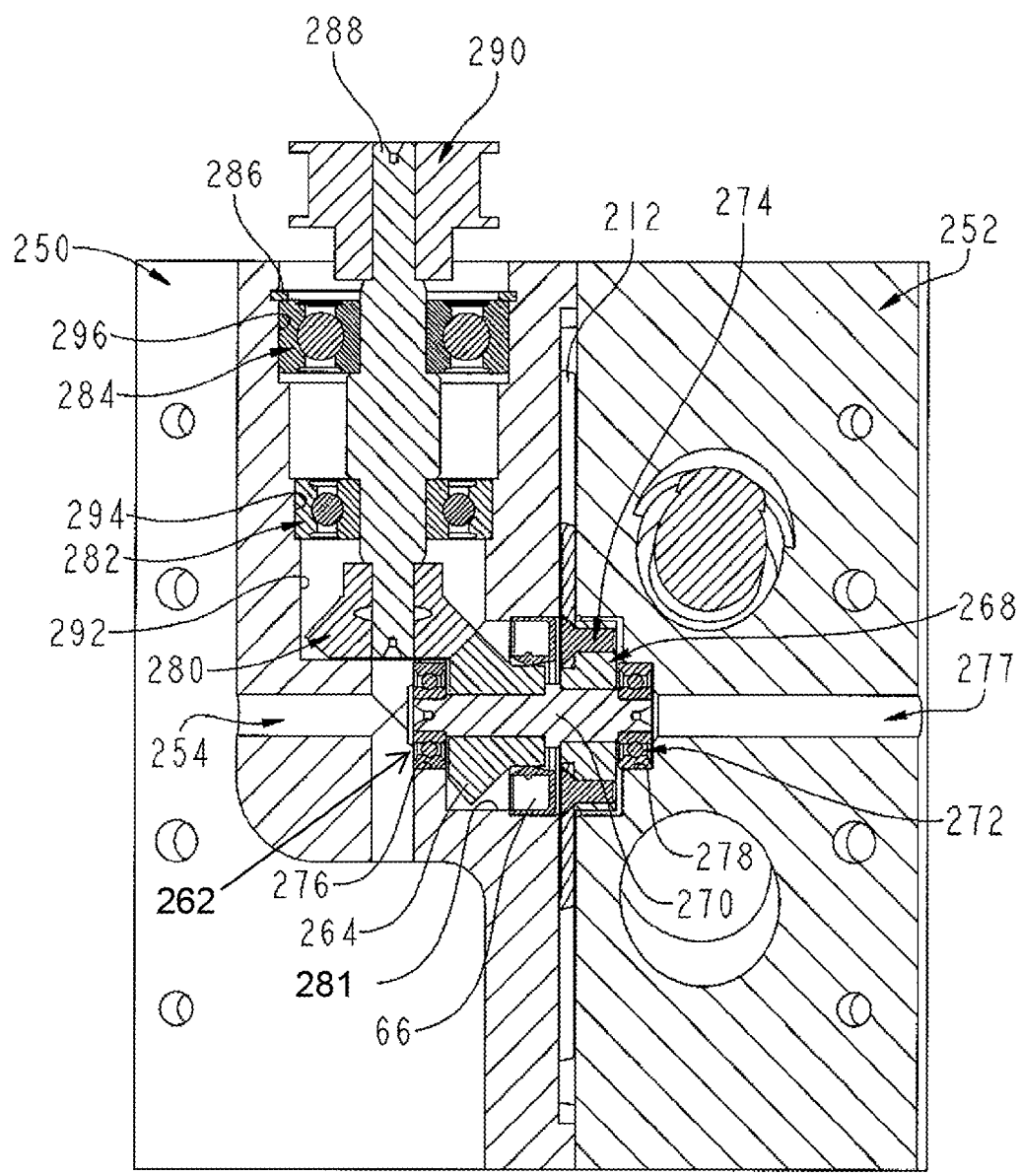
FIG. 17 is a sectional view of the modular engine valve assembly of FIG. 15.
Figure 18:
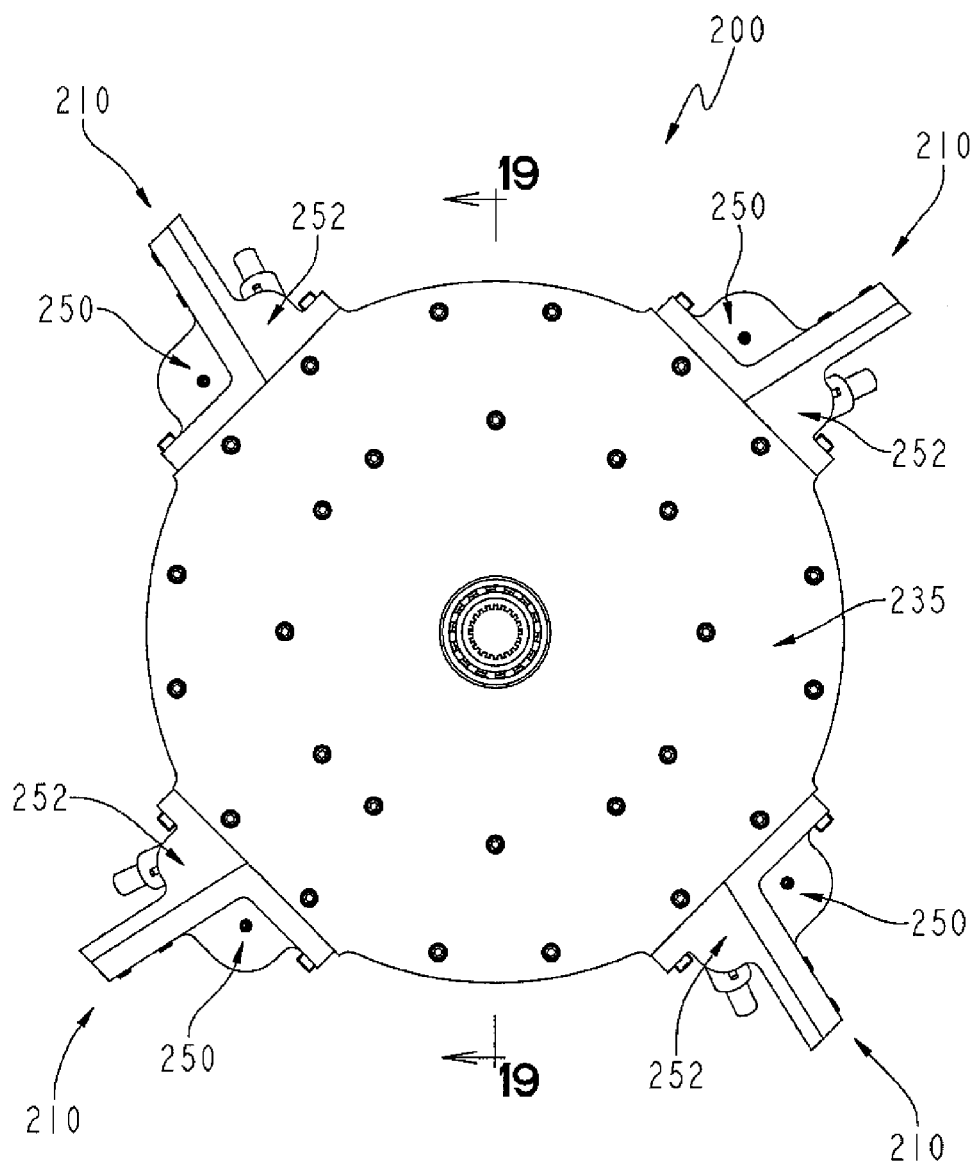
FIG. 18 is a bottom view of the engine of FIG. 13.

Referring to FIG. 17, first bearing 262 s received adjacent surface 276 of first bore 254 and second bearing 272 is received adjacent a surface 278 of a bore 277 in second base member 252 when first base member 250 and second base member 252 are assembled together through couplers 253.

Referring back to FIG. 16, drive system coupling assembly 260 includes a second gear 280, a first bearing 282, a second bearing 284, a retainer 286, a shaft 288, and a drive gear 290. Second gear 280 is coupled to shaft 288 so that second gear 280 rotates with shaft 288. Drive gear 290 is coupled to shaft 288 so that gear 290 rotates with shaft 288. First bearing 282 and second bearing support opposite ends of shaft 288.

Referring to FIG. 17, first bearing 282 is received adjacent surface 294 of second bore 258 and second bearing 272 is received adjacent a surface 296 of second bore 258. Second gear 280 is received in region 292 of second bore 258. Second gear 280 includes teeth which first gear 264. Second gear 280 is maintained in engagement with first gear 264 by retaining shaft 288 in second bore 258 through retainer 286. Retainer 286 is received in a groove 298 of second bore 258.

A rotation of drive gear 290 is transferred to second gear 280 through shaft 288. Second gear 280 transfers the rotation to first gear 264. The rotation of first gear 264 is transferred to engine valve 212 through shaft 270. Drive gear 290 is coupled to an output shaft 121 positioned along longitudinal axis 236. In one embodiment, drive system 38 of FIG. 9 is used to couple drive gear 290 to the main output shaft 121. The drive system 38 is mounted to a surface 297 of block member 230.

Surface 297 of block member 230 may serve as a mounting location for drive system 38, a mounting location for another instance of engine 200, or the mounting of an accessory drive. Exemplary accessory drives include power steering system, an alternator, a fuel pump, and an air conditioner system.

Figure 20A:
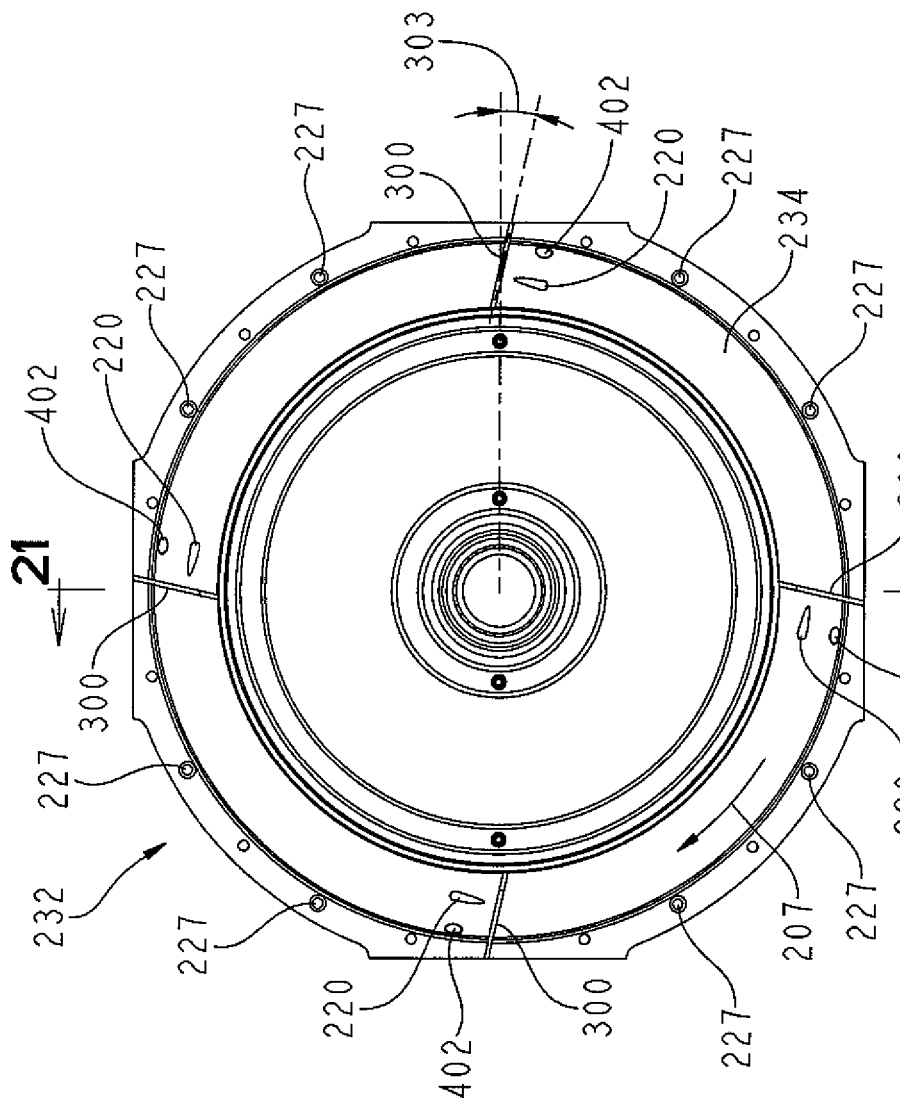
FIG. 20A is a bottom view of an upper block assembly of the engine of FIG. 13.
Figure 22A:
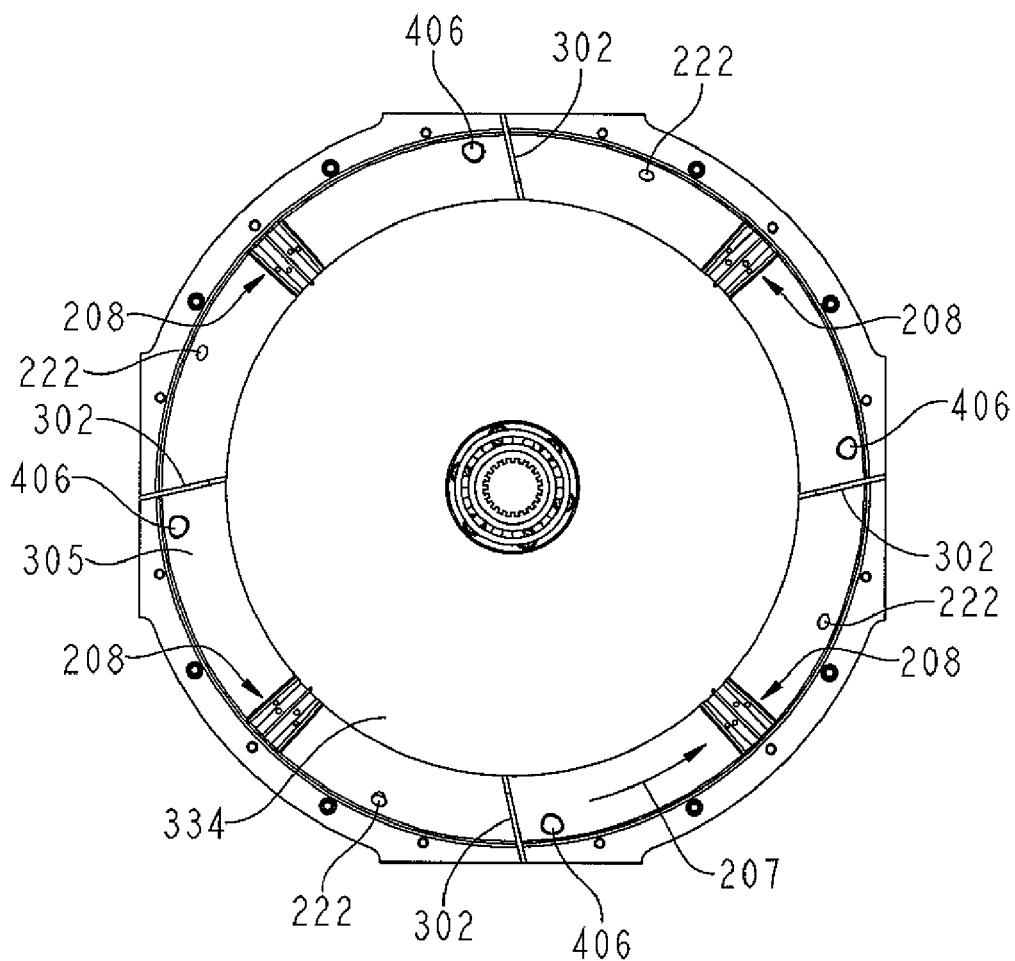
FIG. 22A is a top view of a lower block assembly, connecting disc, and pistons of the engine of FIG. 13.

Each of the modular valve assemblies 210 is assembled to upper block assembly 202 and lower block assembly 204 through couplers 299. As shown in FIGS. 20A and 22A, respective slots 300 and 302 of second block member 232 and block member 233 are angled at an angle 303 relative to a radial normal 304 of piston chamber 206. Pistons 208 travel in direction 207 through piston chamber 206. In one embodiment, slots 300 and 302 are angled at about 12 degrees from radial normal 304. By angling slots 300 and 302 individual piston rings 318, 320, and 322 may be used in place of the single piston rib of engine 10. The angling makes sure that each of piston rings 318, 320, and 322 are not aligned with slots 300 and 302. In one embodiment, an angling of slots 300 and 302 of from about 5 degrees up to about 12 degrees is used. In one embodiment, an angling of slots 300 and 302 of from about 12 degrees up to about 30 degrees. In one embodiment, angle 303 is 12.5 degrees. In one embodiment, angle 303 is selected such that at least half of the piston ring remains in contact with wall of piston chamber 206 as the piston passes by slots 300 and 302. Further, the smaller the angle 303 is the more uniform the air pressure is on valve 212. In one embodiment, piston rings 318, 320, and 322 are made from carbon graphite, the block is anodized with a TEFLON brand coating, and the valves 212 are made of magnesium.

Figure 20B:
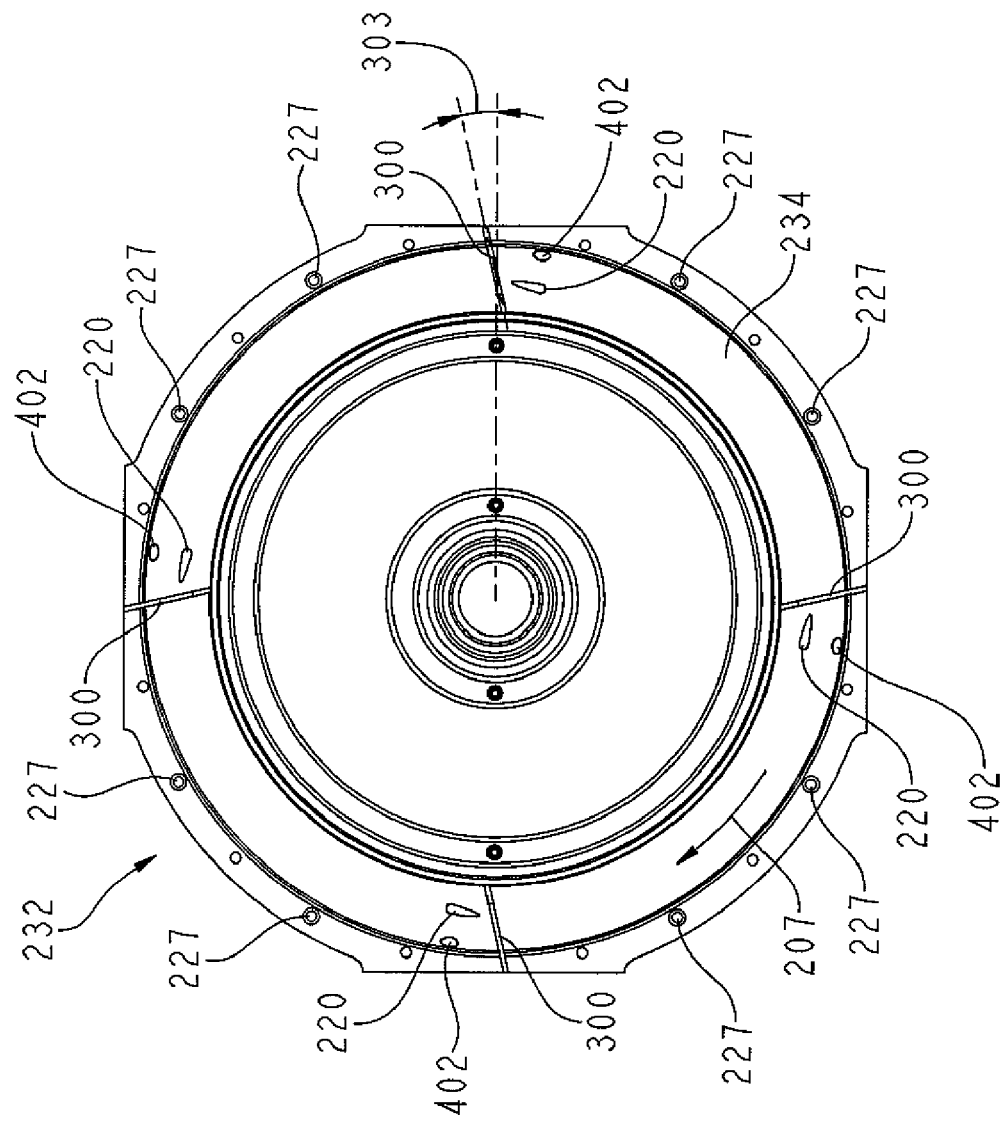
FIG. 20B is a bottom view of an alternate upper block assembly having the engine valves angled in the opposite direction.
Figure 22B:
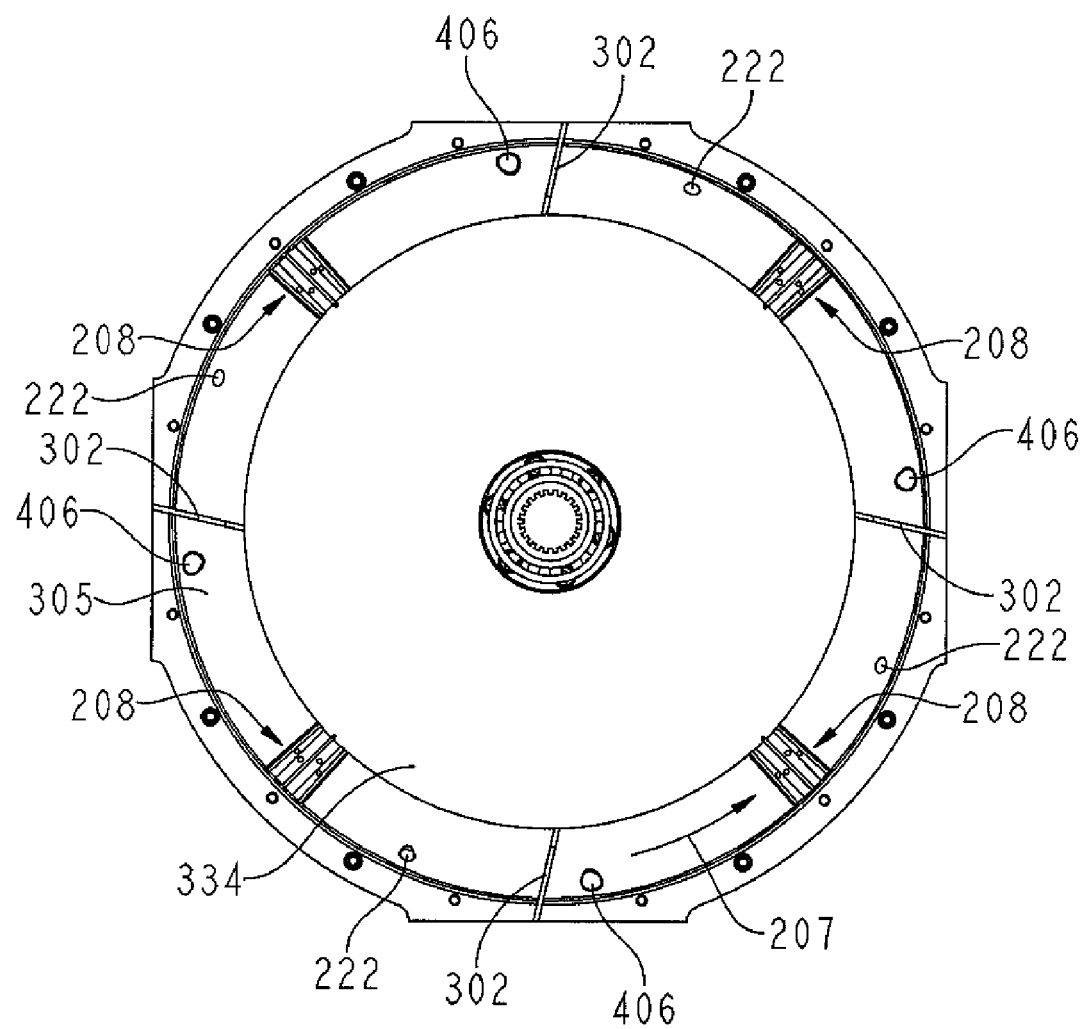
FIG. 22B is a top view of an alternate lower block assembly having the engine valves angled in the opposite direction.

Referring to FIGS. 20B and 22B, another embodiment is shown wherein slots 300 and 302 are angled the other direction about the respective radial normals. Corresponding changes in the shape of members 250 and 252 and block assemblies 202 and 204 should be made. Pistons 208 still travel in the same direction 207.

In one embodiment, slots 300 and 302 are angled about radial normal 304 either alone or in combination with angling relative to radial normal 304. In one embodiment, slots 300 and 302 are generally aligned with radial normal 304 and piston rings 318, 320, and 322 are angled relative to radial normal 304. The angling of piston rings 318, 320, and 322 may be any of the ranges provided above for slots 300 and 302. In one embodiment, both slots 300 and 302 and piston rings 318, 320, and 322 are angled in opposite directions relative to radial normal 304.

Figure 24A:
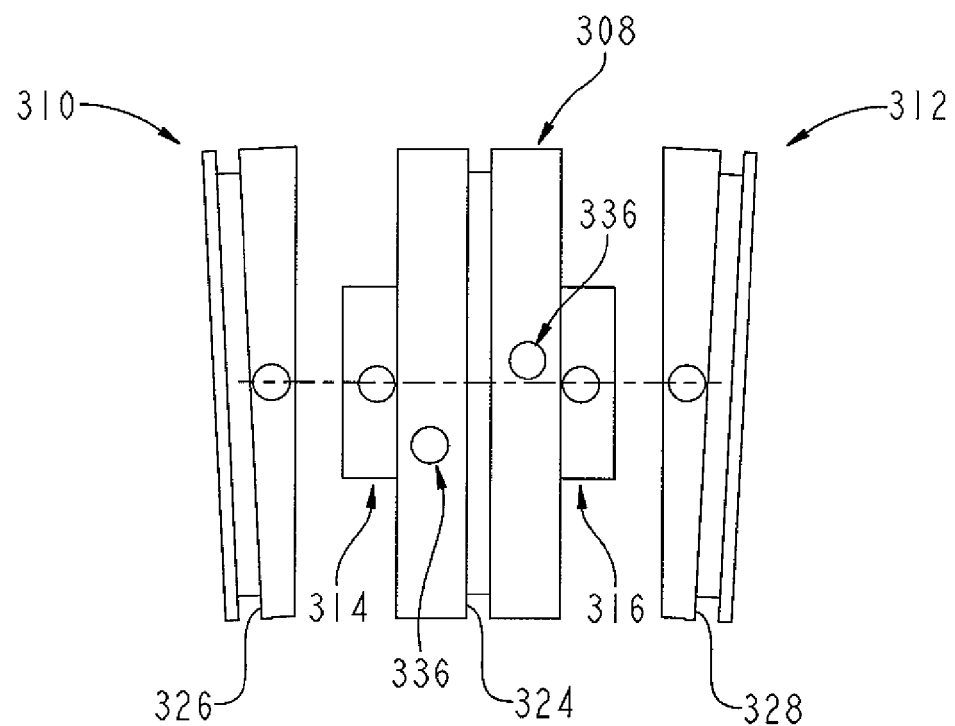
FIG. 24A is an exploded piston assembly.
Figure 24B:
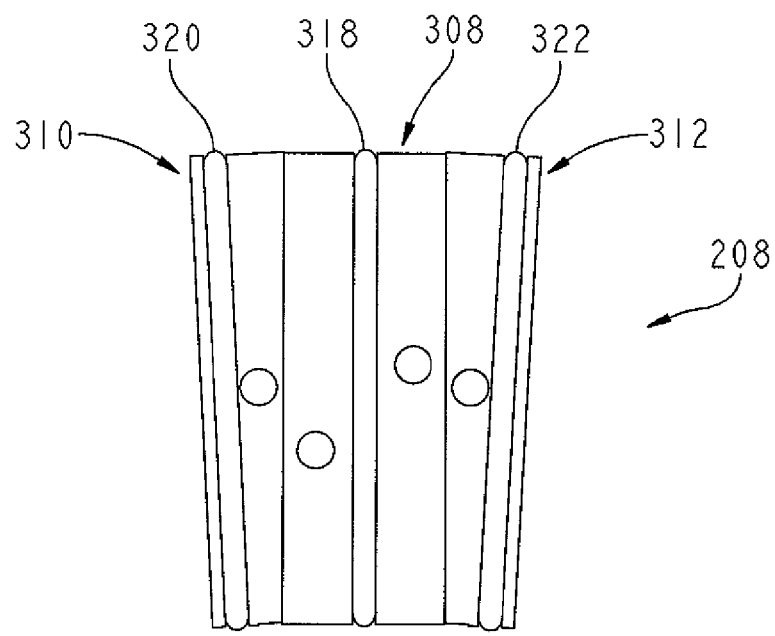
FIG. 24B is an unexploded view of the piston assembly of FIG. 24A

Referring to FIGS. 24A and 25B, piston 208 includes a piston base member 308, a first piston face 310, and a second piston face 312. Each of first piston face 310 and second piston face 312 have recesses which are received on protrusions 314 and 316, respectively, and are secured thereto with roll pins. Each of piston base member 308, first piston face 310, and second piston face 312 include a circumferential slot 324, 326, and 328, respectively, which receives a respective one of piston rings 318, 320, and 322. In one embodiment, piston base 308, piston face 310, and piston face 312 are combined into a single integral component.

Figure 26:
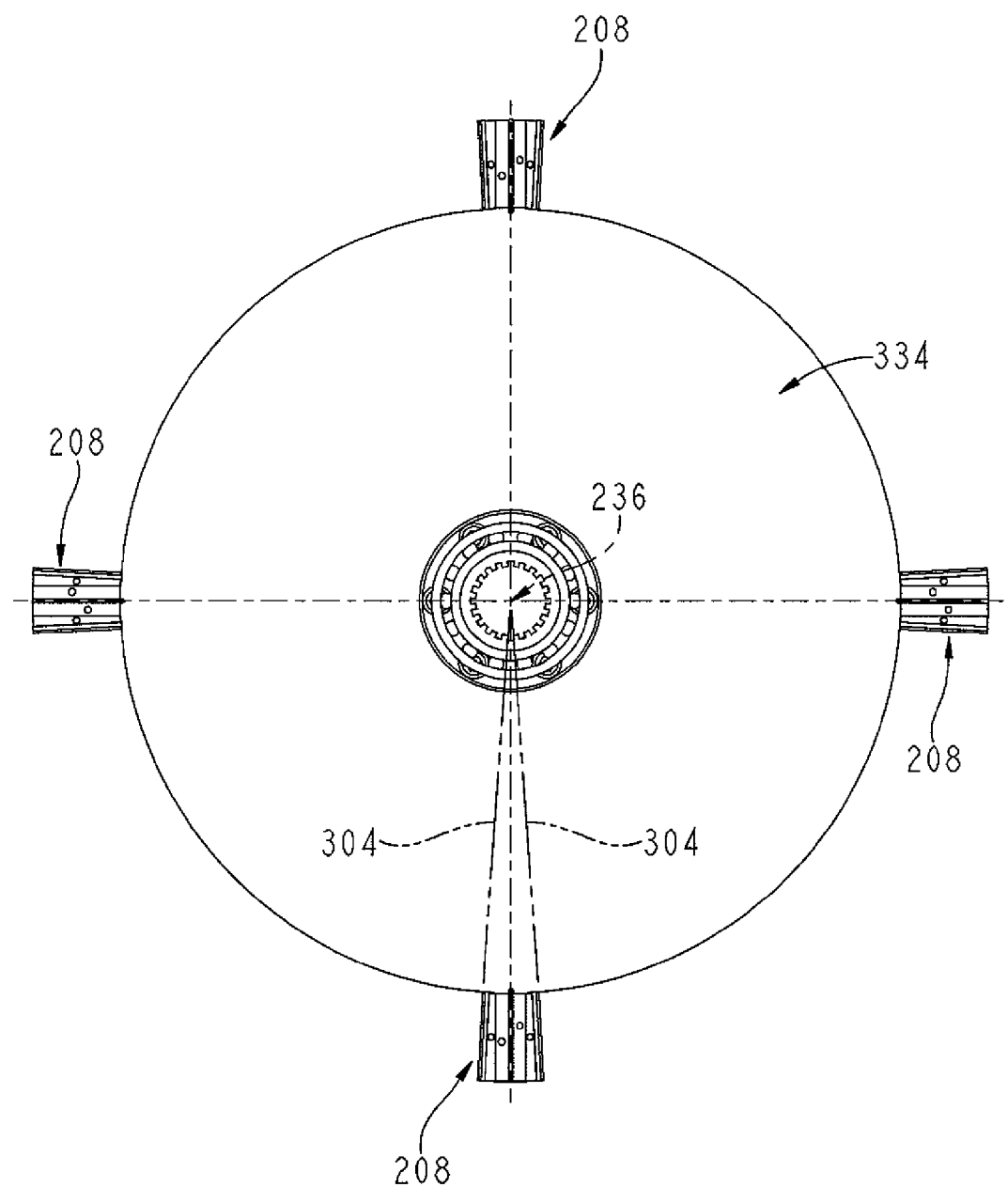
FIG. 26 is a top view of a connecting disc supporting a plurality of piston assemblies.
Figure 27:
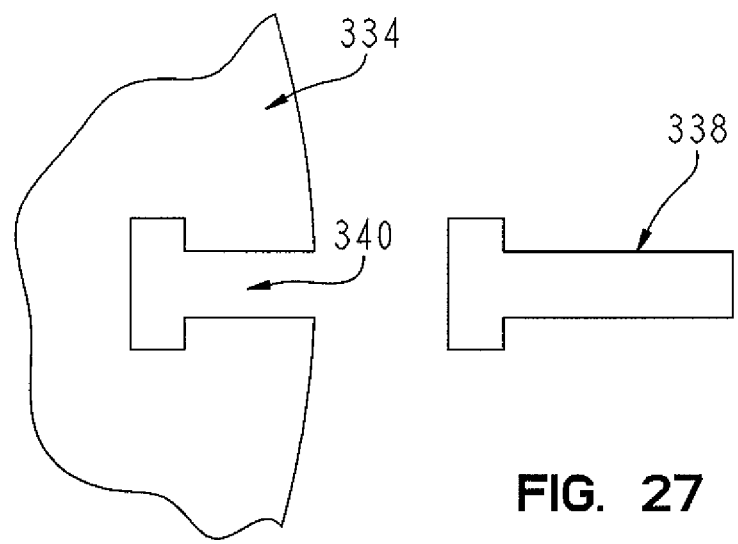
FIG. 27 is a perspective view of another embodiment of the connecting disc including a removable tab.

In one embodiment, the end of piston face 310 and the end of piston face 312 are parallel to a radial normal line 304 of engine 200 as shown in FIG. 26. In one embodiment, the end of piston face 310 and piston face 312 is other than parallel to a radial normal line 304 of engine 200.

Figure 25:
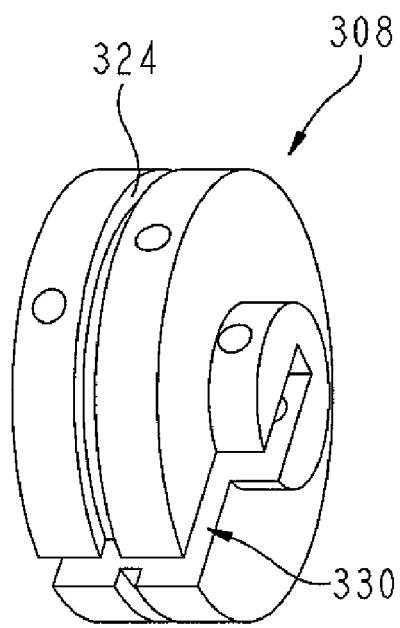
FIG. 25 is a perspective view of a piston base member.

Referring to FIG. 25, piston base member 308 includes a recess 330 which receives a tab 332 (see FIG. 23B) on connecting disc 334. Piston base member 308 is coupled to tab 332 through a pair of roll pins received in apertures 336. In one embodiment, shown in FIG. 27, a removable tab 338 is coupled to connecting disc 334. Removable tab 338 is received in an opening 340 of connecting disc 334. Tab 338 may be secured to connecting disc 334 by fasteners, shear pins, interlocking members, or any other suitable means.

In one embodiment, tab 338 breaks away from connecting disc 334 if engine 200 malfunctions and piston assembly 208 runs into valve 212. By permitting tab 338 to break away, connecting disc 334 is able to continue to spin with the main output shaft 121. This permits in a multi-module engine (having multiple instances of engine 200 mounted to a common output shaft 121) for the engine to continue to operate even if one of the modules has malfunctioned. The malfunctioning module would simply have a connecting disc 334 spinning with less than all of its pistons operating.

Figure 19:
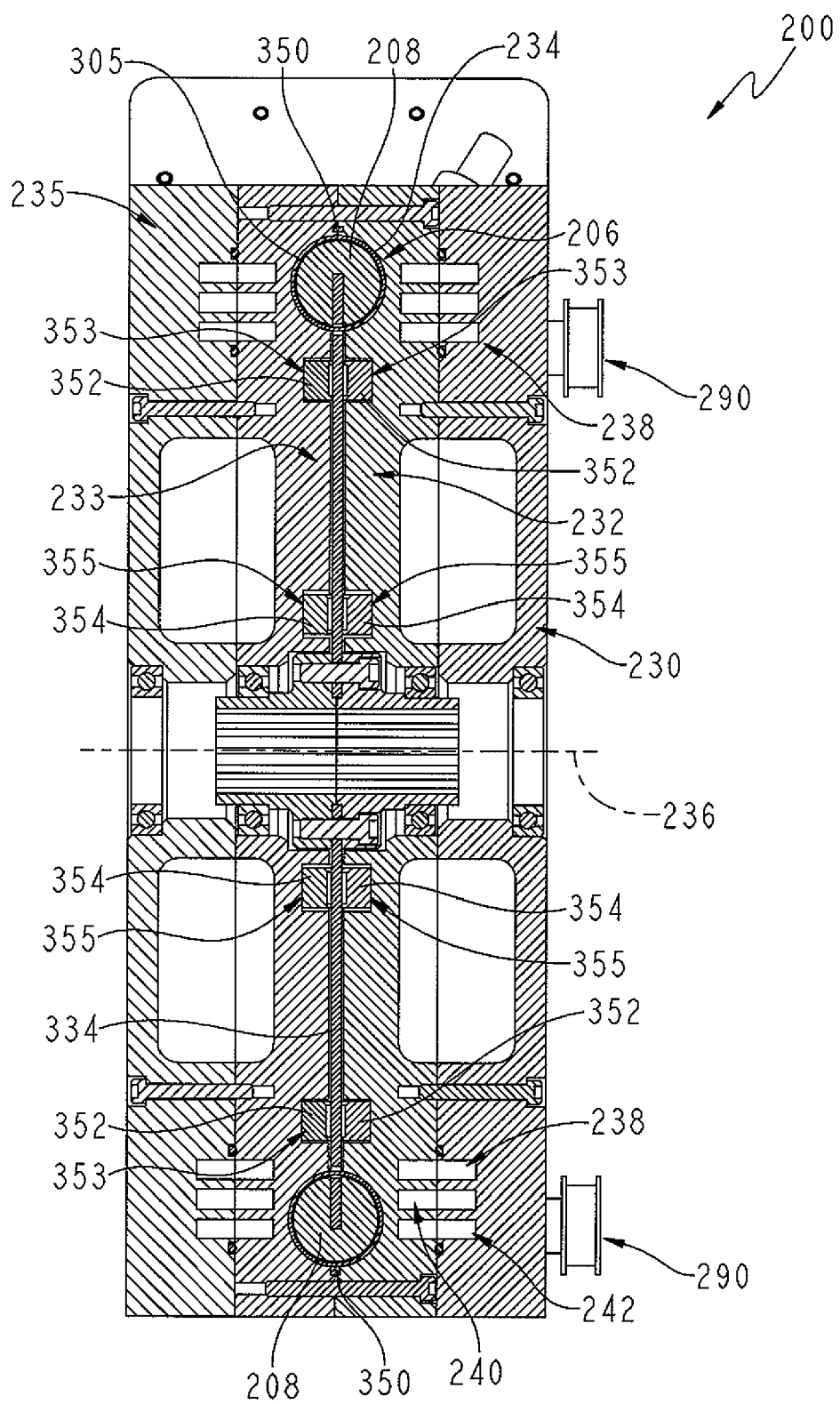
FIG. 19 is a sectional view of the engine of FIG. 13 along lines 19-19 in FIG. 17.
Figure 19A:
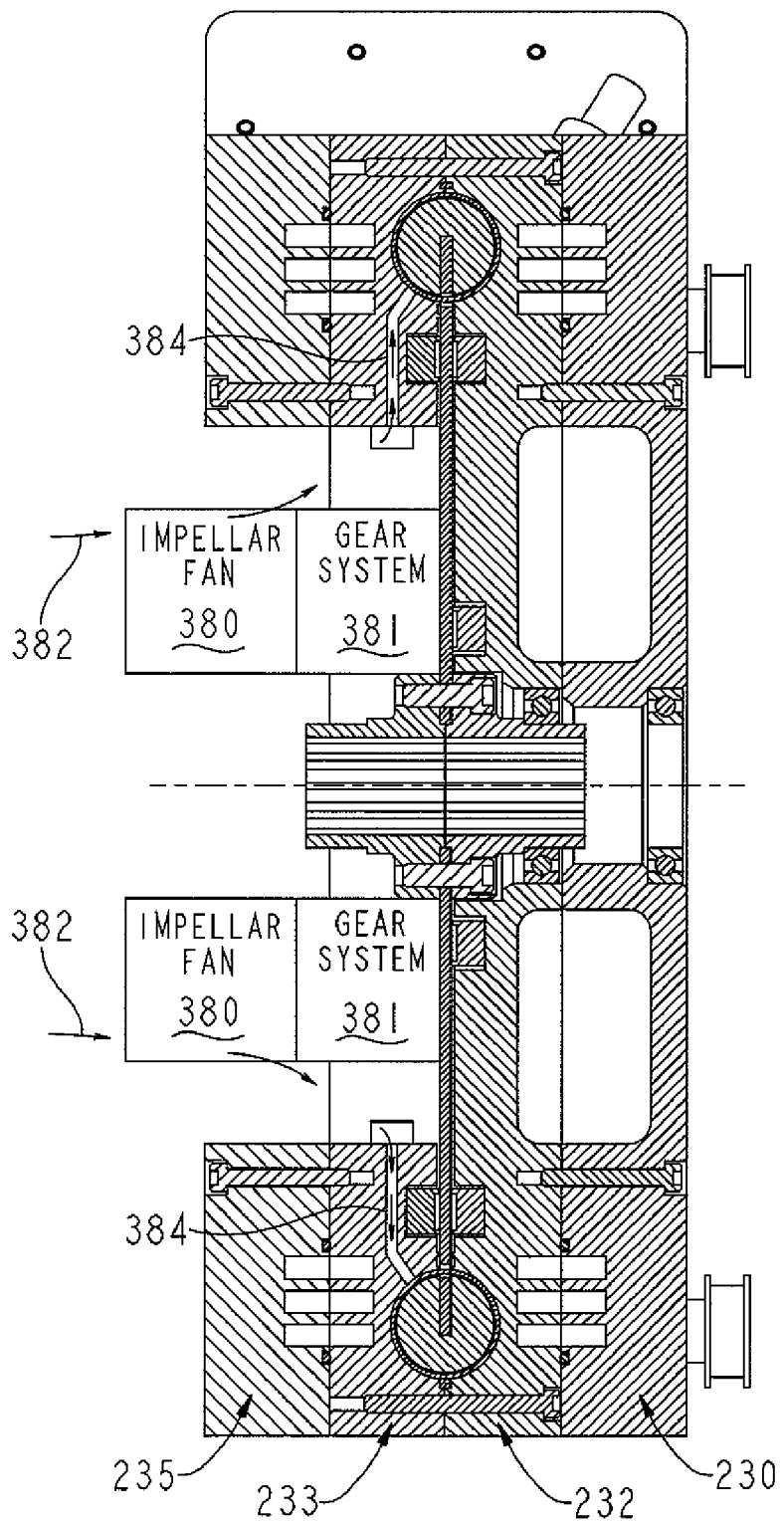
FIG. 19A is a sectional view of an alternative embodiment of the engine of FIG. 13 including an impellar fan to provide pressurized air to piston chamber 206.
Figure 21:
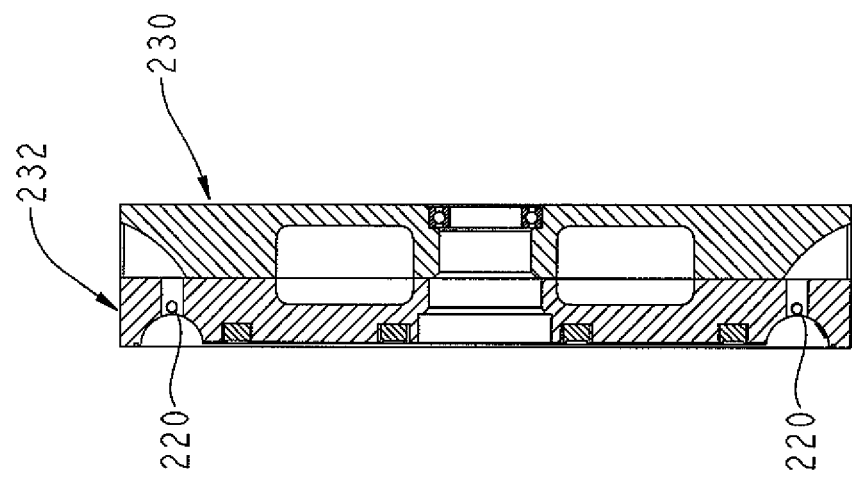
FIG. 21 is a sectional view of the upper block assembly of FIG. 20 along lines 21-21 in FIG. 20.

Referring to FIG. 19, piston chamber 206 is sealed along an outer edge through the contact of block members 232 and 233. Piston chamber 206 along an inner edge includes a gap through which connecting disc 334 extends. Piston chamber 206 may be sealed along this inner edge relative to connecting disc 334 in multiple ways. As shown in FIG. 19, two instances of a first seal 352 are received in corresponding recesses 353 of block members 232 and 233, respectively. Each of seals 352 include multiple contact areas which contact connecting disc 334. Illustratively, each of seals 352 includes two contact areas which contact connecting disc 334. Seals 352 each include openings 358 which receive fasteners to secure seals 352 to the respective block members 232 and 233.

Two instances of a second seal 354 in the same manner are received in corresponding recesses 355 of block members 232 and 233, respectively. Second seal 354 operates as a secondary seal. Each of seals 354 include multiple contact areas which contact connecting disc 334. Illustratively, each of seals 354 includes two contact areas which contact connecting disc 334. Seals 354 each include openings 360 which receive fasteners to secure seals 354 to the respective block members 232 and 233. In one embodiment, connecting disc 334 carries one or both of the two instances of seals 352 and 354 such that the seals rotate with connecting disc 334.

By having spaced apart seals 352 and 354 the vibration of connecting disc 334 may be reduced. Further, the spaced apart seals 352 and 354 keep the connecting disc 334 flat and centered.

Figure 30:
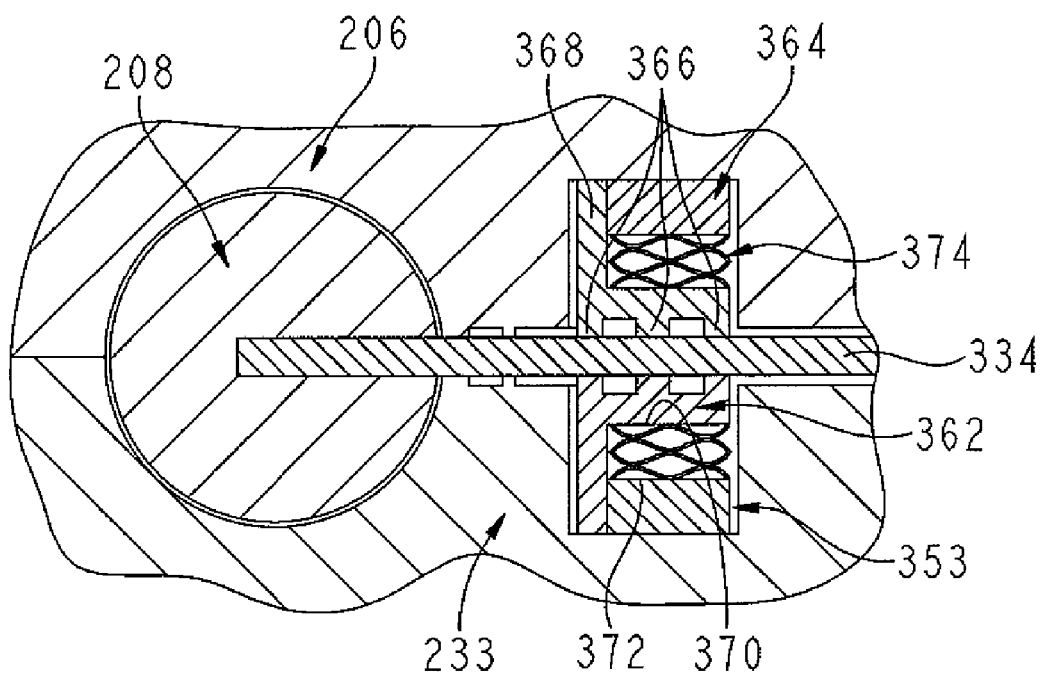
FIG. 30 illustrates an exemplary seal.

Referring to FIG. 30, a seal 360 is shown. Seal 360 is shown replacing seal 352 in recess 353. Seal 360 may also or in the alternative replace seal 354. Seal 360 is able to accommodate different spacings between connecting disc 334 and block members 232 and 233. This reduces the tolerance needed when machining block members 232 and 233, such as a depth of recess 353. Seal 360 is expandable to ensure contact with both recess 353 and connecting disc 334.

Seal 360 includes a first seal member 362 and a second seal member 364. Seal member 362 includes a plurality of contact areas 366 which contact connecting disc 334. Illustratively three contact areas 366 are shown. Seal 360 further includes a downwardly extending leg portion 368. Leg portion 368 contacts second seal member 364. The spacing between a surface 370 of first seal member 362 and a surface 372 of second seal member 364 is biased by a biasing member 374. In one embodiment, biasing member 374 is a spring. In one embodiment, biasing member 374 is a wave spring. Exemplary wave springs include Model No. CRR-0950-0.156 available from Smalley Steel Rings located at 555 Oakwood Road, Lake Zurich, Ill. 60047. Biasing member 374 maintains contact areas 366 of first seal member 362 in contact with connecting disc 334. This automatically adjusts seal 360 to account for machining irregularities and to make up for any wear.

Air from piston chamber 206 is blocked by seal 360. In order to pass between connecting disc 334 and seal 360, the air has to pass between each of the three contact areas 366 and connecting disc 334. Alternatively, the air has to travel down a wall of recess 353 and pass between first seal member 362 and second seal member 364. Seal 360 functions to prevent the flow of air in either direction resulting in more pressure being used to urge piston 208 further along its orbit about piston chamber 206. Seals 352 and 354 also function to prevent the flow of air in either direction resulting in more pressure being used to urge piston 208 further along its orbit about piston chamber 206.

Figure 31:
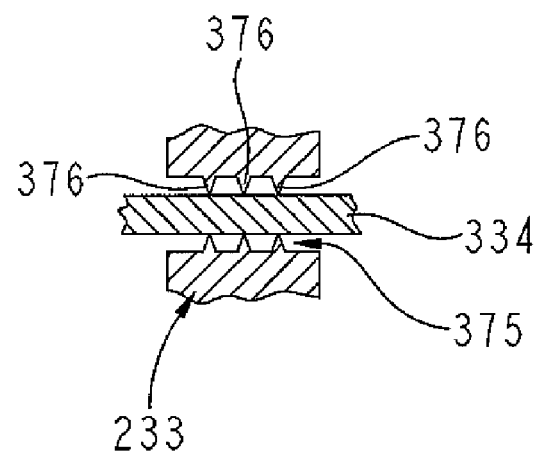
FIG. 31 illustrates another exemplary seal.

Referring to FIG. 31, a knife edge seal 375 is formed between block member 233 and connecting disc 334. Knife edge seal 375, in one embodiment, is located between recess 353 and piston chamber 206. Knife edge seal 375 includes a plurality of protrusions 376 which reduce the gap between block member 233 and connecting disc 334. This in effect increases the resistance of travel of air from piston chamber 206 between connecting disc 334 and block member 233. Knife edge seal 375 may be used in concert with one or more of seals 352, 354, and 360.

In one embodiment, connecting disc 334 includes a layer of a sealing coating. The sealing coating may be applied by either dipping connecting disc 334 into the coating material or spray applying the sealing coating layer. Exemplary sealing coatings include carbon graphite, ceramic, and other materials which will wear to an appropriate fit with minimal friction. In one embodiment, the layer is about 0.005 of an inch to about 0.010 of an inch thick.

Once block assemblies 202 and 204 are assembled with connecting disc 334 assembled thereto, connecting disc 334 is rotated and the sealing coating is worn to adjust to the shape of the gap between block members 232 and 233. In one embodiment, the sealing coating on connecting disc 334 is used in combination with any of seals 352, 354, 360, and 375.

Figure 32:
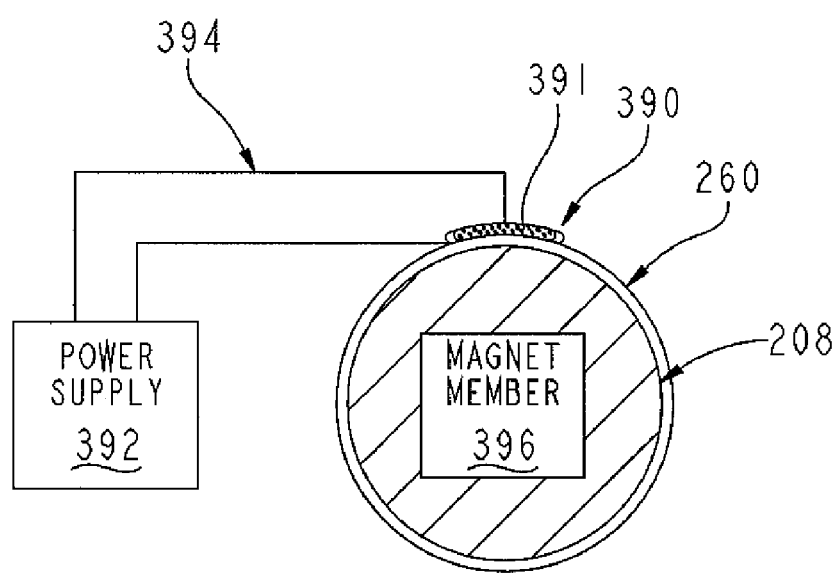
FIG. 32 illustrates a power generation assembly of the engine of FIG. 13.

Referring to FIG. 32, in one embodiment, either engine 10 or engine 200 generates electrical power. Engine 200 is represented in FIG. 32. A conductive wire 390 is wrapped around a base member 391. The conductive wire is positioned proximate to wall of the piston chamber 206. In one embodiment, the wall of the piston chamber is made of an insulating material at least in the region corresponding to the location of the conductive wire 390.

The conductive wire 390 is connected to a power supply 392 through a wire 394. Piston 208 carries a magnetic member 396, such as a permanent magnet. In one embodiment, the magnetic member 396 is an insert in a side of piston 208 proximate to wire 390. As piston 208 with magnet member 396 passes by the wound wire 390 an electrical field is induced in wound wire 390. This causes a current to flow in wire 394 and the electrical energy is stored in power supply 392. This power may be used to operate various application devices. Exemplary application devices include the ignition system. In one embodiment, the power generated eliminates the need for a conventional alternator.

Figure 28:
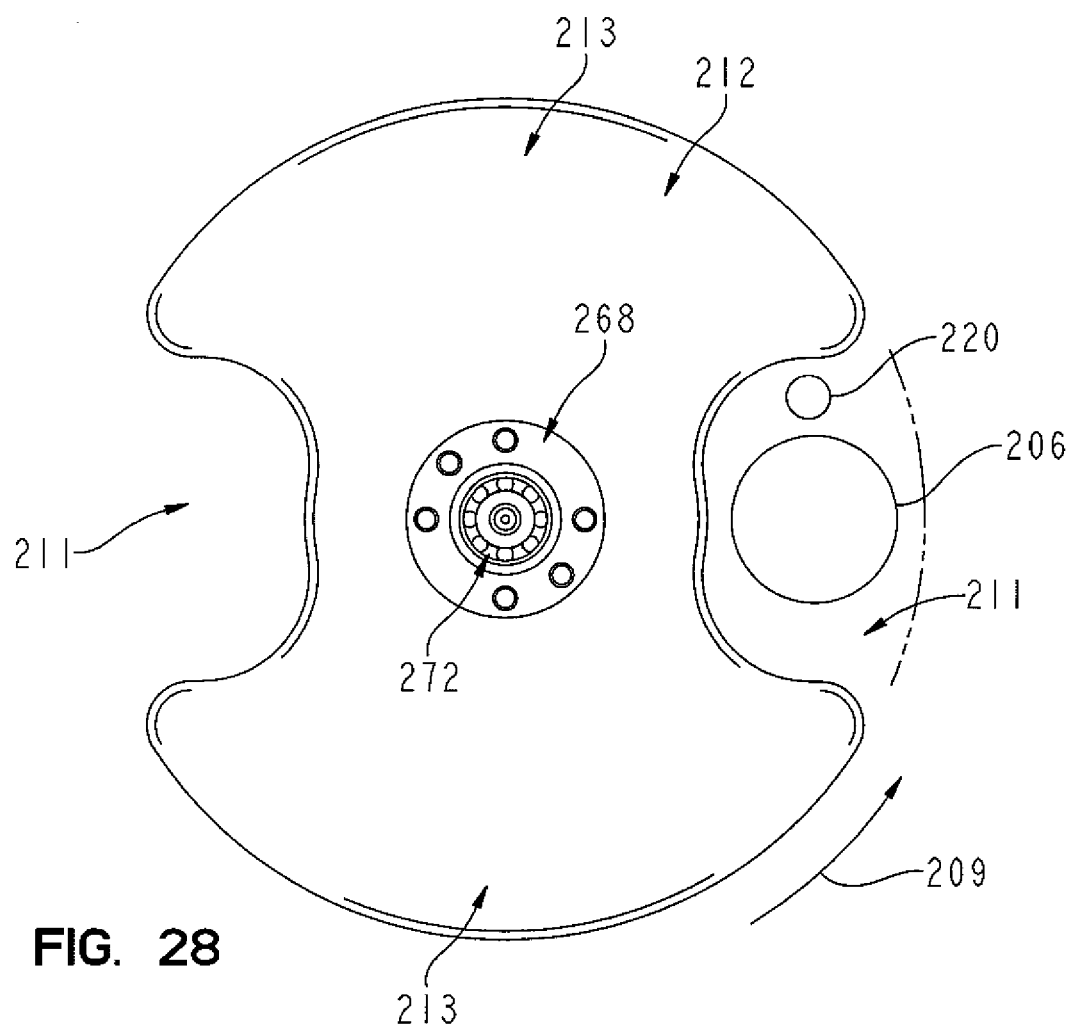
FIG. 28 is a representative view of the interaction of an engine valve of the engine of FIG. 13, a piston chamber, and an air supply line.

In operation, valve 212 rotates in direction 209 (FIG. 28). Valve 212 includes a plurality of openings 211. As shown in FIG. 28, openings 211 are sized to align valve 212 relative to piston chamber 206 in a non-interfering position. As opening 211 rotate in direction 209 tabs 213 of valve 212 overlap piston chamber 206 forming a ignition chamber area between a just passing piston 208 and tab 213 of valve 212 and an exhaust chamber between the next piston 208 and tab 213 of valve 212, as explained in U.S. patent application Ser. No. 11/451,120, filed Jun. 12, 2006 and U.S. Pat. No. 7,059,294, the disclosures of which are expressly incorporated herein by reference.

Fuel is introduced into a ignition chamber area of piston chamber 206 through a fuel inlet 402 and is supplied through a fuel injector 404. In one embodiment, fuel injector 404 is replaced with a carburetor. In one embodiment, fuel injector 404 is replaced with a throttle body. Air is introduced into an ignition chamber area of piston chamber 206 through an air inlet 220. In one embodiment, the air is provided through an injector. In one embodiment, the air is provided through an impellar fan 380. In one embodiment, air and fuel are injected together with an injector. A spark to ignite the fuel and air mixture is provided through inlet 406 (FIG. 22) with an ignition member 408. An exemplary ignition member is a sparkplug. The combustion gases are expelled from piston chamber 206 through an exhaust outlet 222 (see FIG. 22).

In the illustrated embodiment in FIG. 28, air inlet 220 is either blocked by a tab 213 of valve 212 or unblocked when aligned with one of openings 211. The location of air inlet 220 relative to openings 211 in valve 212 and relative to piston chamber 206 is chosen such that air inlet is unblocked at least when tab 213 blocks piston chamber 206 prior to the ignition of the air with ignition member 408. In one embodiment, a separate opening is provided in valve 212 to control the provisional of air to a ignition chamber area of piston chamber 206. In one embodiment, the separate opening is inward of openings 211. In one embodiment, wherein a throttle body or carburetor is used, valve 212 controls the provision of air and fuel to a ignition chamber area of piston chamber.

In one embodiment, the air and fuel injected into piston chamber 206 is first introduced into the ignition chamber area. In one embodiment, at least the air is introduced into the piston chamber 206 prior to being introduced into the ignition chamber area.

Engine 200 may be assembled in the following manner. Piston body members 308 are coupled to tabs 332 (see FIG. 23B) of connecting disc 334. In one embodiment, the piston body members are coupled to tabs 332 through roll pins. Piston ring 318 is received by groove 324. Piston face members 310 and 312 are coupled to piston body member 308. In one embodiment, piston face members 310 and 312 are coupled to piston body member 308 through roll pins. Seals 279 are coupled to connecting disc 334 between pistons 208.

TurnEngine valve assemblies 210 are assembled. Gear 264 is coupled to shaft 270. In one embodiment, each of gear 264 and shaft 270 include interlocking spline features. In one embodiment, gear 264 is coupled to shaft 270 with a roll pin. Couple bushing 268 to valve 212 with couplers 274. Position seal 266 on shaft 270 adjacent gear 264. Seal 266 abuts surface 281. Couple the combination of bushing 268 and valve 212 to shaft 270. In one embodiment, bushing 268 and shaft 270 include interlocking spline features. Position bearing 262 onto shaft 270 and position the assembly into bore 254 in first base member 250. Position bearing 272 onto shaft 270 and position the assembly in bore 277 of second base member 252. First base member 250 and second base member 252 are coupled together. In one embodiment, first base member 250 and second base member 252 are coupled together through fasteners 253.

Turning to assembly 263 of engine valve assembly 210, bearings 282 and 284 are assembled to shaft 288. Gear 280 is coupled to shaft 288. In one embodiment, each of gear 280 and shaft 288 have interlocking spline features. This assembly is positioned in bore 258 of first base member 250 such that the teeth of gear 280 engage the teeth of gear 264. The assembly is retained in bore 258 by coupling retainer 286 to first base member 250. In one embodiment, retainer 286 is a clip retainer which is received in groove 298 of first base member 250. Finally, gear 290 is coupled to shaft 288 such that shaft 288 rotates with gear 290.

Figure 23B:
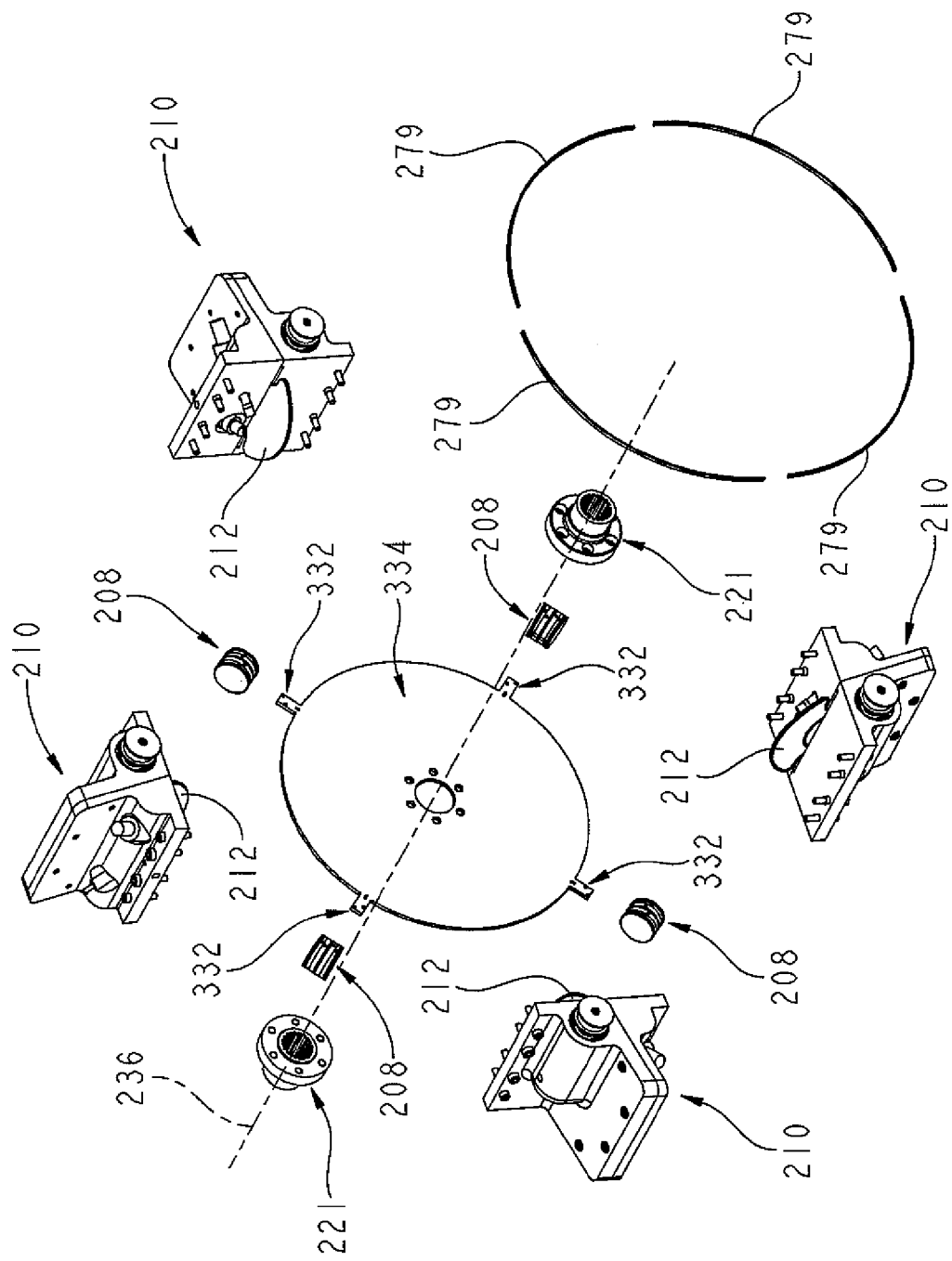
Figure 23C:
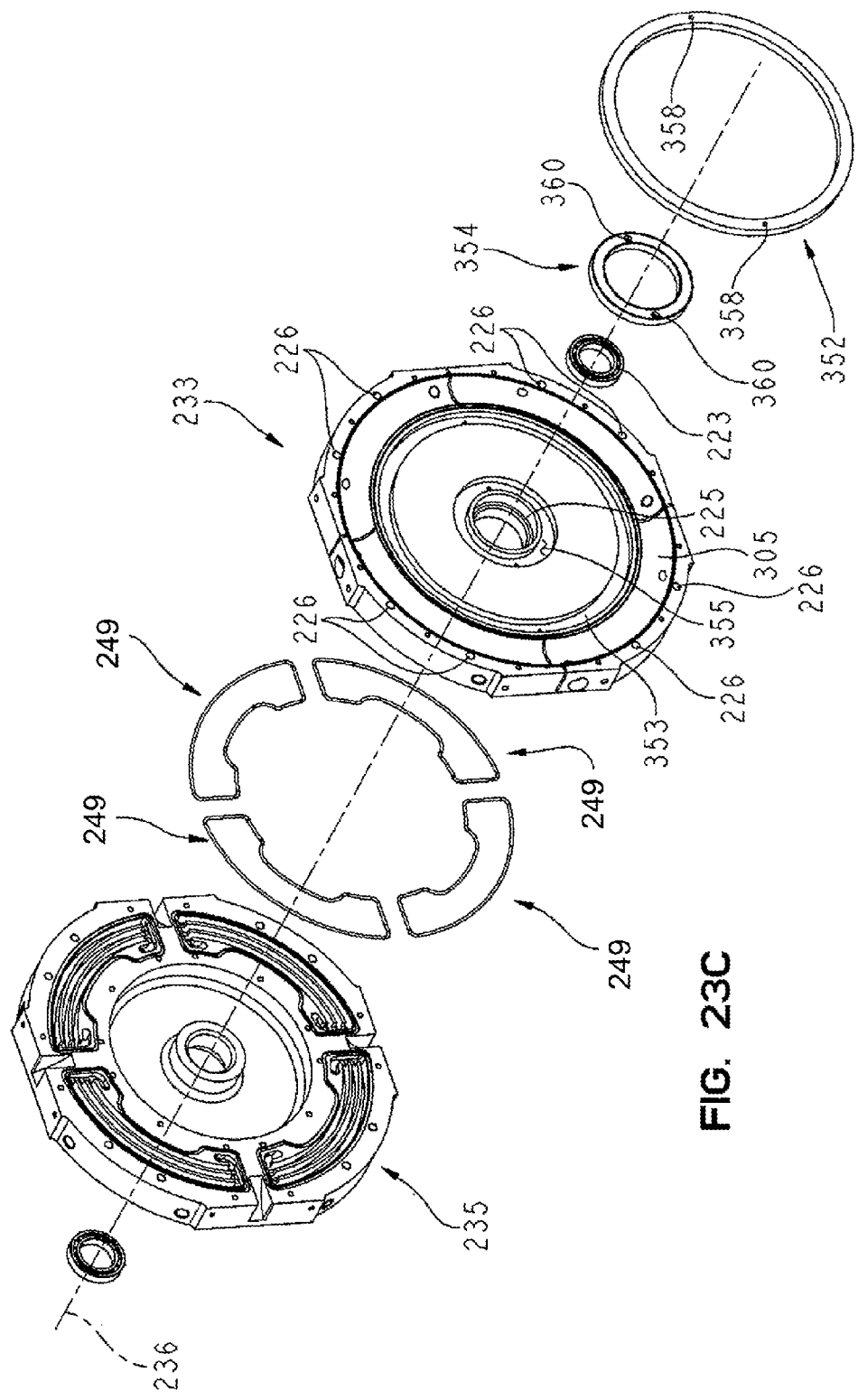

Turning to FIG. 23B, flanges 221 are coupled to connecting disc 334. In one embodiment, flanges 221 are connected to connecting disc 334 through a plurality of couplers. Referring to FIG. 23C, bearing 223, seal 352, and seal 354 are received in recesses 225, 353, and 355 of block member 233, respectively. Seals 352 and 354 in one embodiment are coupled to block member 233 with a plurality of fasteners. One of the flanges 221 coupled to connecting disc 334 may then be received within bearing 233 and positioned such that connecting disc 334 contacts seals 352 and 354. In the same manner, seals 352 and 354 and bearing 228 many be assembled to block member 232. Block member 232 may then receive the other of flanges 221 such that connecting disc 334 contacts the seals 352 and 354 of block member 232.

Block member 232 is aligned with block member 233. As shown in FIG. 20A, block member 232 includes a plurality of locators 227 which are received by locators 226 on block member 233. In one embodiment, locators 227 are pins received in openings (locators 226). Block member 232 is coupled to block member 233 through a plurality of fasteners, such as screws or bolts. Similar locators are used to align block member 230 and block member 232 and block member 235 with block member 233. Block member 230 is coupled to block member 233 through a plurality of fasteners, such as screws or bolts.

Figure 29:
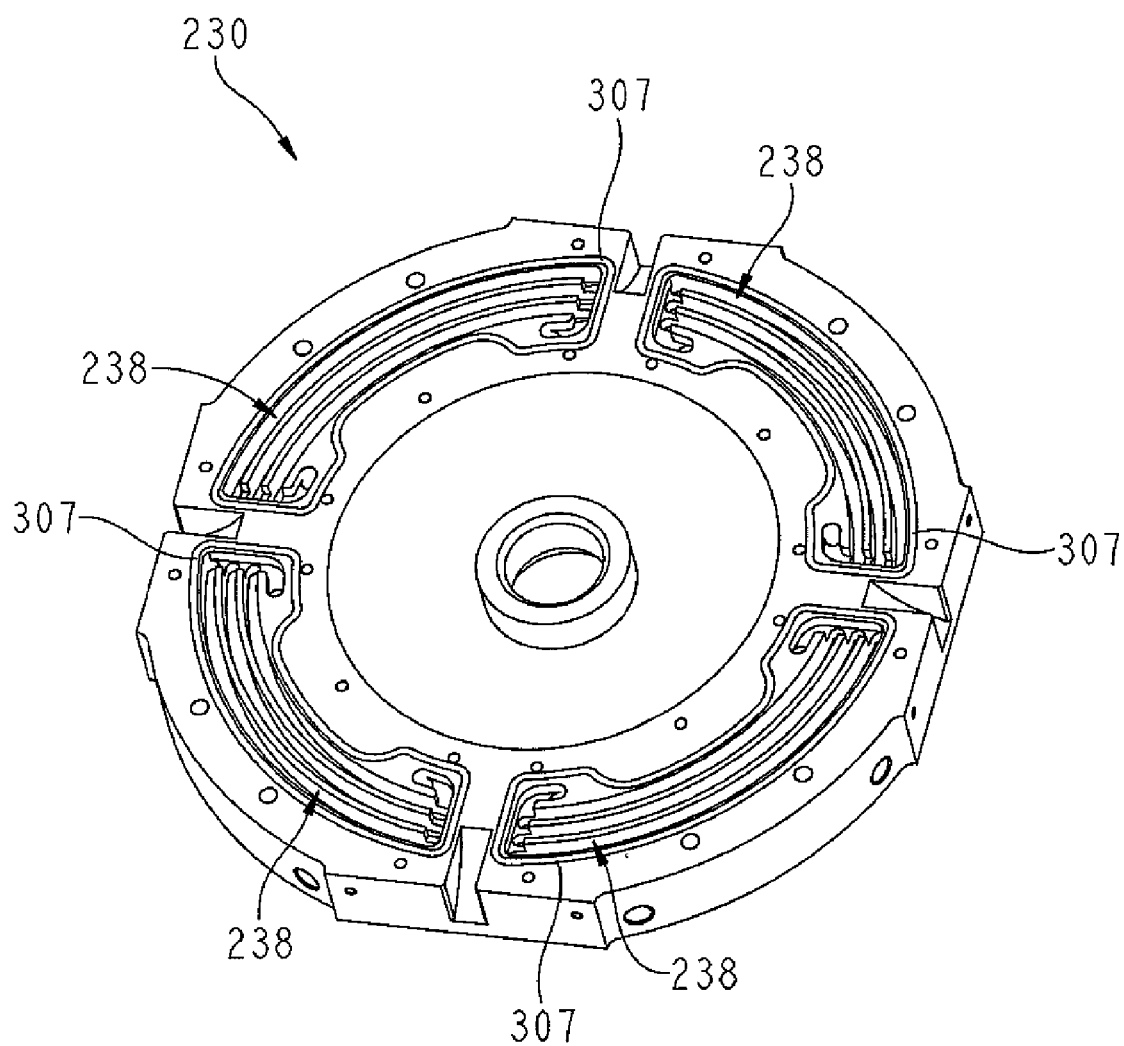
FIG. 29 is a bottom, perspective view of a block member of the engine of FIG. 13.

Turning to FIG. 23A, seals 249 are positioned in grooves on block member 230 (see FIG. 29). Block member 232 is aligned with block member 230. Similar seals are positioned between block member 233 and block member 235.

An output shaft 121 is coupled to flanges 221 of connecting disc 334. In one embodiment, the output shaft 121 and the flanges have interlocking spline features. Also, the engine valve assemblies 210 are coupled to the block assemblies 202 and 204. The drive system 38 is installed. Ignition members 408 are coupled to valve assemblies 210 along with fuel injectors. An air supply and an exhaust system are also coupled to the one of the block assemblies or the valve assemblies.

By having engine valve assemblies 210 as a modular component, easily removed from block assemblies 202 and 204, repair or inspection of a given valve 212 is greatly simplified. The respective engine valve assembly 210 is removed and the valve is repaired or inspected without the need to disassemble the block assemblies 202 and 204.

The above detailed description of the illustrated embodiments, examples, and the appended figures are for illustrative purposes only and are not intended to limit the scope and spirit of the invention, and its equivalents. One skilled in the art will recognize that many variations can be made to the invention disclosed in this specification without departing from the scope and spirit of the invention.

The invention claimed is:

1. A method of operating an engine, comprising the steps of:
    providing an orbital engine having a piston which orbits through a toroidal piston chamber and a first rotatable engine valve which moves between an open position wherein an opening of the first rotatable engine valve aligns with the toroidal piston chamber and a closed position wherein a tab of the first rotatable engine valve aligns with the toroidal piston chamber;
    providing an air inlet adjacent the first rotatable engine valve through which pressurized air is introduced into the toroidal piston chamber;
    aligning the opening of the first rotatable engine valve with the toroidal piston chamber;
    passing the piston through the opening; and
    aligning the opening of the first rotatable engine valve with the air inlet to provide pressurized air to an area of toroidal piston chamber behind the piston when the first rotatable engine valve is in the closed position wherein the tab of the first rotatable engine valve is aligned with the toroidal piston chamber.

2. The method of claim 1, further comprising the steps of:
    aligning the tab with the toroidal piston chamber to form an ignition chamber area between the piston and the first engine valve; and
    igniting a fuel mixture in the ignition chamber area, the fuel mixture being first positioned in the ignition chamber area of the toroidal piston chamber.

3. The method of claim 1, wherein the first rotatable engine valve includes a first opening which is aligned with the toroidal piston chamber when the first rotatable engine is in its open position, the first rotatable engine valve including a separate second opening which is positioned to be aligned with the air inlet to provide pressurized air to an area of toroidal piston chamber behind the piston when the first rotatable engine valve is in the closed position.

* * * * *